April 12, 1960 G. E. SUDEROW 2,932,486
JACKING MECHANISM AND CONTROLS
Filed July 20, 1955 8 Sheets-Sheet 1
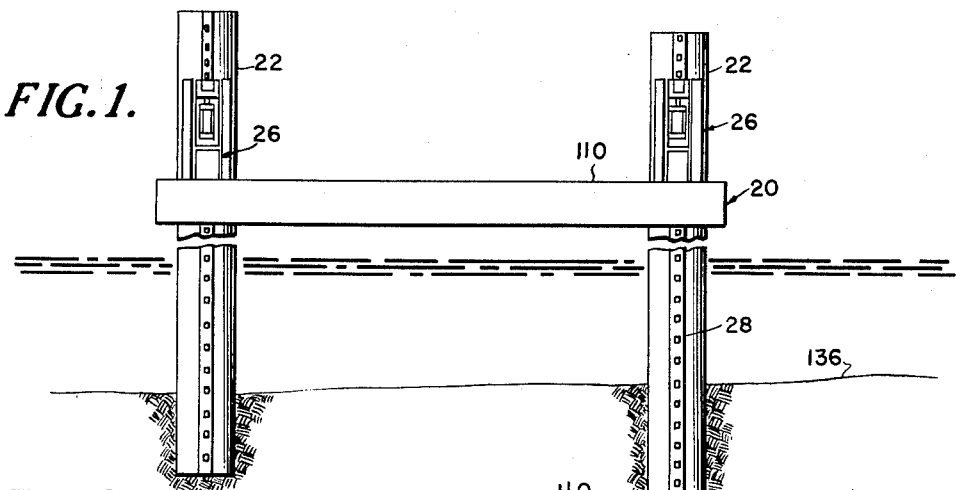
FIG.1.
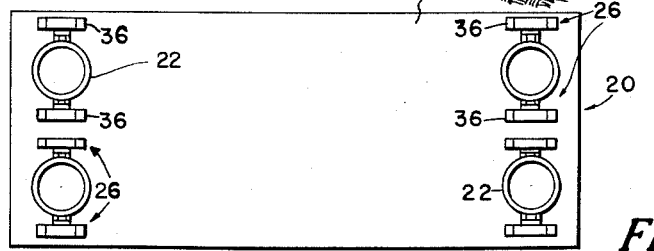
FIG.2.
FIG.16.
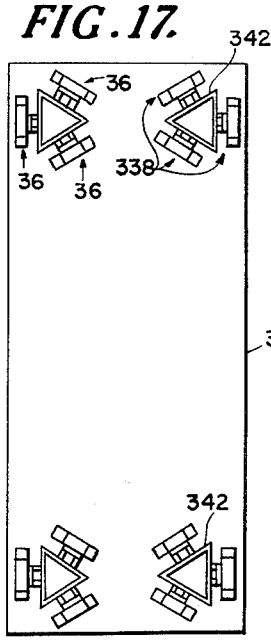
FIG.17.
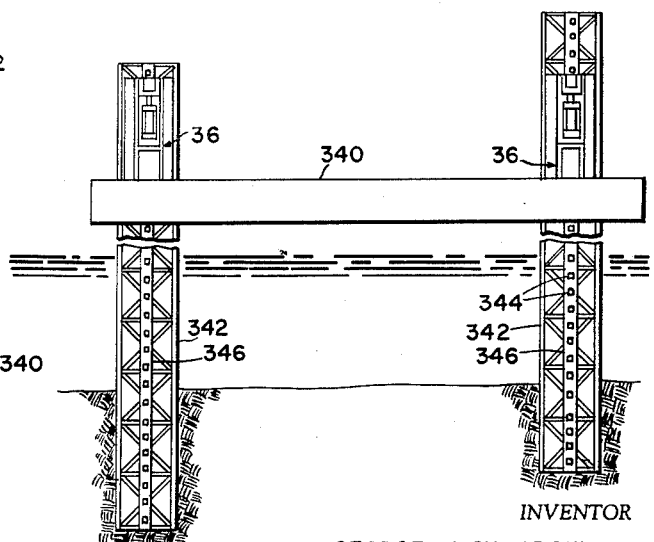
INVENTOR
GEORGE E. SUDEROW
BY Cushman, Darby & Cushman
ATTORNEYS April 12, 1960   G. E. SUDEROW   2,932,486
JACKING MECHANISM AND CONTROLS
Filed July 20, 1955   8 Sheets-Sheet 2

INVENTOR
GEORGE E. SUDEROW
BY Cushman, Darby & Cushman
ATTORNEYS

April 12, 1960
G. E. SUDEROW
2,932,486
JACKING MECHANISM AND CONTROLS
Filed July 20, 1955
8 Sheets-Sheet 3
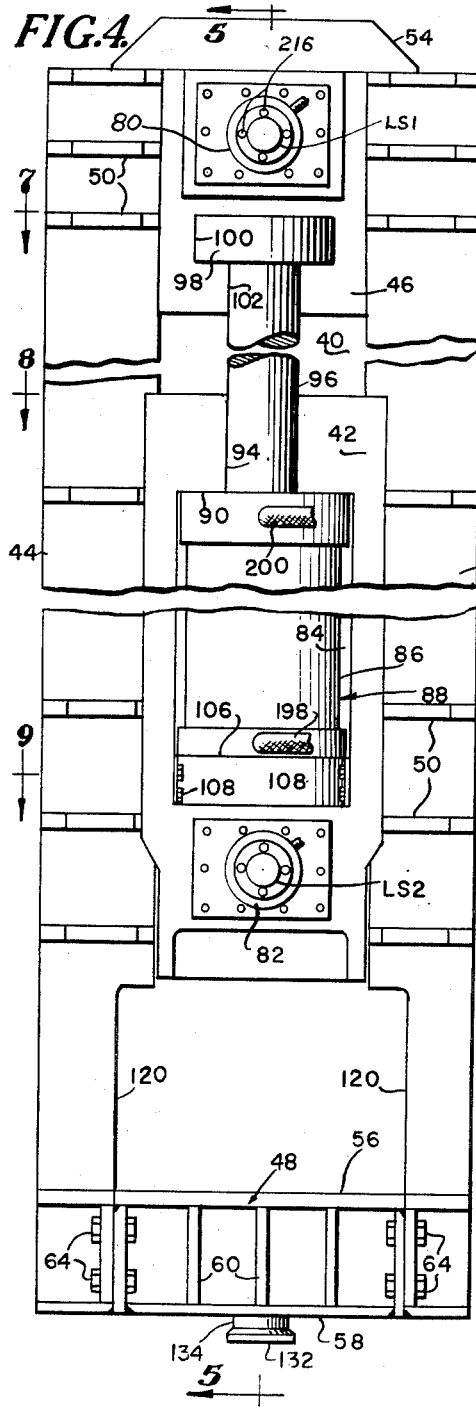
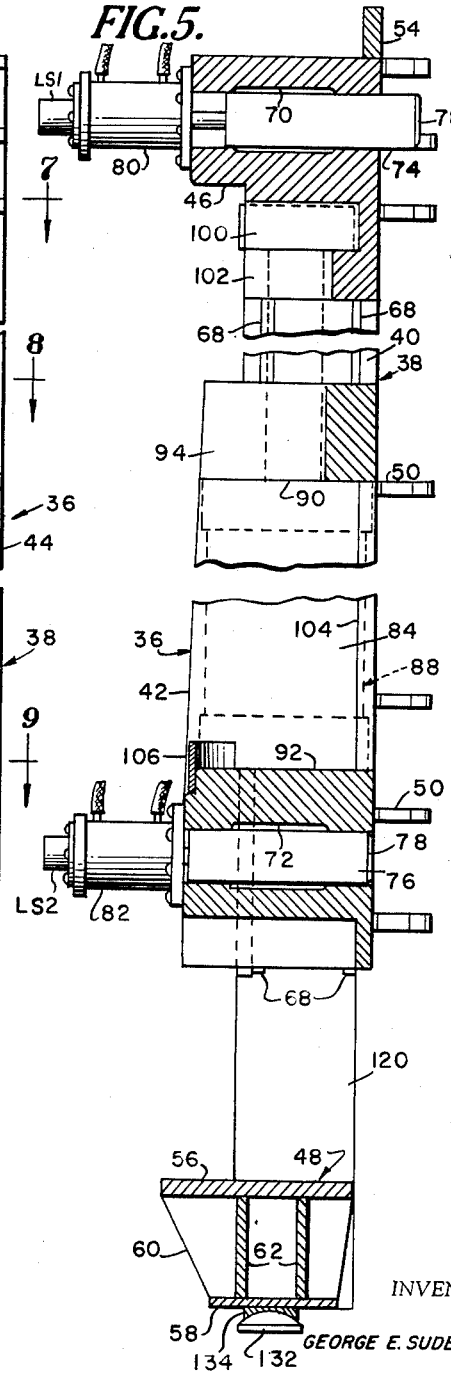
INVENTOR
GEORGE E. SUDEROW
BY Cushman, Darby & Cushman
ATTORNEYS April 12, 1960

G. E. SUDEROW 2,932,486

JACKING MECHANISM AND CONTROLS

Filed July 20, 1955

INVENTOR
GEORGE E. SUDEROW

BY Cushman, Darby & Cushman

ATTORNEYS

April 12, 1960 G. E. SUDEROW 2,932,486
JACKING MECHANISM AND CONTROLS
Filed July 20, 1955 8 Sheets-Sheet 5

INVENTOR
GEORGE E. SUDEROW

BY Cushman, Darby & Cushman
ATTORNEYS

| United States Patent Office | 2,932,486
Patented Apr. 12, 1960 |

2,932,486

JACKING MECHANISM AND CONTROLS

George E. Suderow, New York, N.Y., assignor to De Long Corporation, New York, N.Y., a corporation of Delaware Application July 20, 1955, Serial No. 523,323

31 Claims. (Cl. 254—93)

This invention relates to an improved jacking mechanism for use in effecting relative vertical movement between a platform and one of a plurality of supporting legs therefor. More especially this invention relates to an improved jacking mechanism for use with the supporting legs of marine platforms of the general type shown in the co-pending applications of Pointer, Serial No. 283,567 filed April 22, 1952, now Patent No. 2,775,869 and Serial No. 143,627 filed February 11, 1950 now forfeited.

In the aforementioned Pointer applications, there is shown a barge having a plurality of vertical guiding openings extending therethrough and mounting corresponding vertically-movable platform-supporting legs in the form of cylindrical caissons. Each caisson is forcefully movable in either an upward or a downward direction relative to the barge by a pneumatic jacking mechanism which includes a pair of vertically-spaced leg-gripping assemblies having fluid-pressure-operated means connected thereto for moving them away from or toward each other. Each gripper assembly consists of a plurality of hollow annular resilient constricting tubes, which when filled with fluid under pressure tightly grip the caisson. With this jacking mechanism, each caisson can be moved in a step-by-step fashion upwardly or downwardly relative to the barge, or by releasing both of the gripping assemblies, the caisson is free to move vertically relative to the barge. In use of the Pointer apparatus, the barge can be towed to a selected marine site, the legs moved down into engagement with the marine bottom, and the barge raised on the legs to serve as a dock, a stable base for marine drilling operations, or as a stable marine platform for any other purpose.

While the aforementioned jacking mechanism has proved most satisfactory for its intended purpose and has had widespread commercial success, the engagement of this jacking mechanism with a caisson is frictional only, with a consequent limitation on the jacking force which can be effected without slippage. Moreover, when a caisson becomes smeared with oil, mud, or the like, the frictional grip of the jacking mechanism is somewhat impaired, with an even greater limitation on the jacking force which can be effected without slippage.

Although the Pointer type of jacking mechanism is equipped with most satisfactory controls for operating a plurality of jacks either selectively and individually or in unison, such controls including valve mechanisms for introducing pressure fluid to and exhausting pressure fluid from each of the gripper assemblies and the fluid-pressure-operated means, such controls require manual operation. Since the stroke of any type of step-by-step jack is limited, it requires a considerable number of jacking cycles to raise a barge on its supporting legs from water level to an elevation of the order of 40 feet above water level. Moreover, the time required to raise a barge a distance of the order of 40 feet is considerable. Throughout this entire period of time, the controls for the Pointer type of jack must be continually manipulated by an operator, with resulting fatigue.

The Pointer type of jacking mechanism also is so arranged that in order to lower a load, either a supporting leg or a platform, fluid pressure is bled controllably from the fluid-pressure-operated means. Such control of a load-lowering operation is not always completely satisfactory.

Accordingly, it is an object of this invention to provide an improved type of jacking mechanism of the foregoing type, which has positive engagement against slippage with a corresponding supporting leg.

It is another object of this invention to provide an improved type of jacking mechanism, which has positive engagement against slippage with a supporting leg, with means for temporarily supporting the leg from a platform independently of the jacking mechanism and then quickly and easily releasing the support of such leg to enable the latter to drop free in its guide.

It is another object of this invention to provide an improved positive-engagement jacking mechanism that is equipped with controls for selectively effecting various types of jacking cycles automatically.

It is a further object of this invention to provide an improved step-by-step jacking mechanism which requires the application of fluid pressure to effect relative movement in either direction between a supporting leg and a platform mounting the same.

Other objects and advantages of the invention will become apparent from the following description and accompanying drawings in which:

Figure 1 is a side elevational view of a barge provided with vertically movable supporting legs operable by jacking mechanisms embodying this invention. The barge is shown supported on the legs above water.

Figure 2 is a plan view of the barge shown in Figure 1.

Figure 4 is a front elevational view of a single one of the two jacks which comprise the jacking mechanism shown in Figure 3, which such jack being shown independently of its mounting on the barge and of its supporting leg and with the quick-release mechanism being omitted.

Figure 5 is a vertical sectional view taken substantially on line 5—5 of Figure 4 with the jacking motor being shown in phantom.

Figures 16 and 17 are views corresponding to Figures 1 and 2 illustrating the application of the jacking mechanism to a different type of supporting leg.

Figure 3:
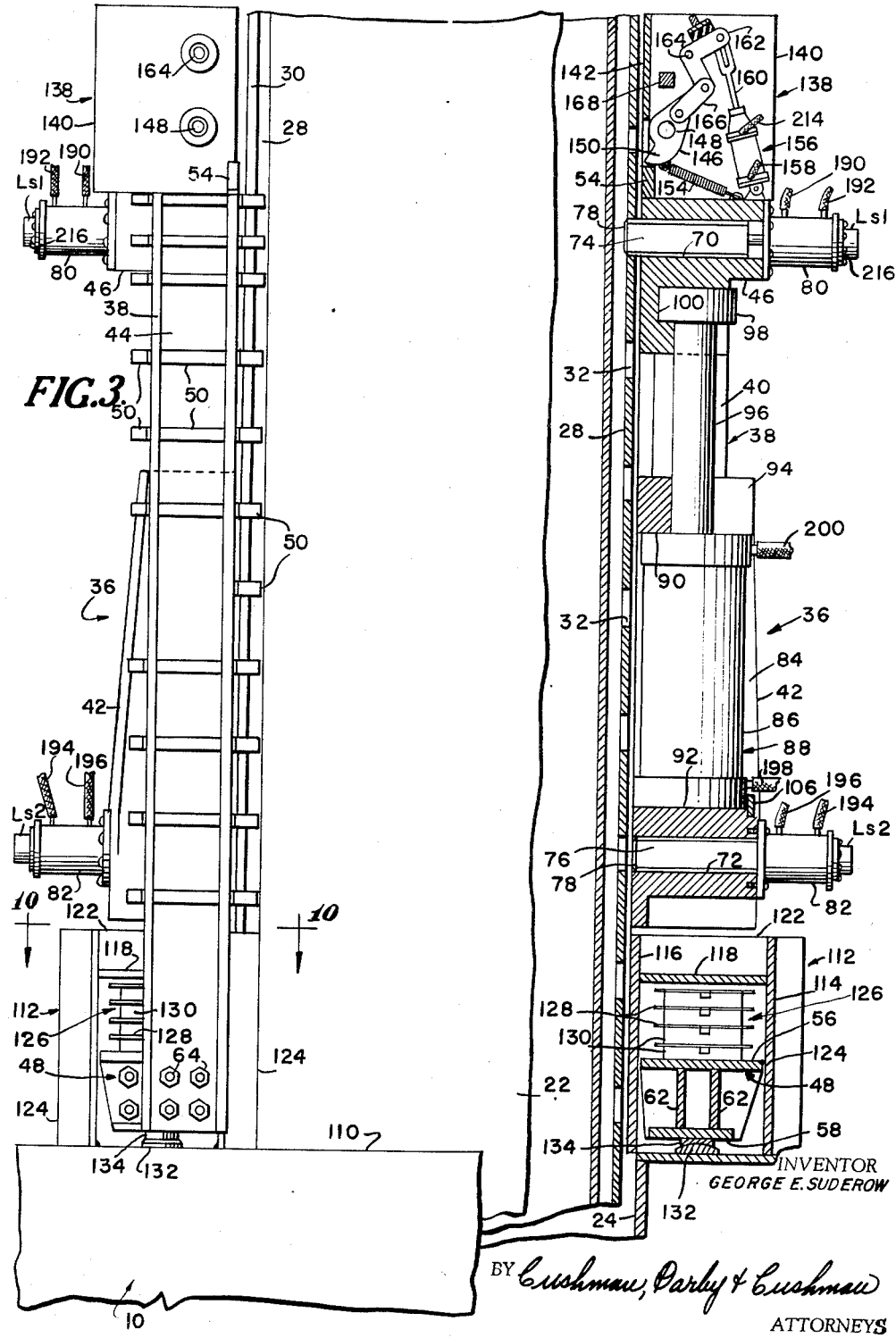
Figure 3 is an enlarged fragmentary elevational view of the jacking mechanism for a single supporting leg of the barge shown in Figure 1. The right hand portion of the view is shown in vertical section in order to illustrate details.
Figure 6:
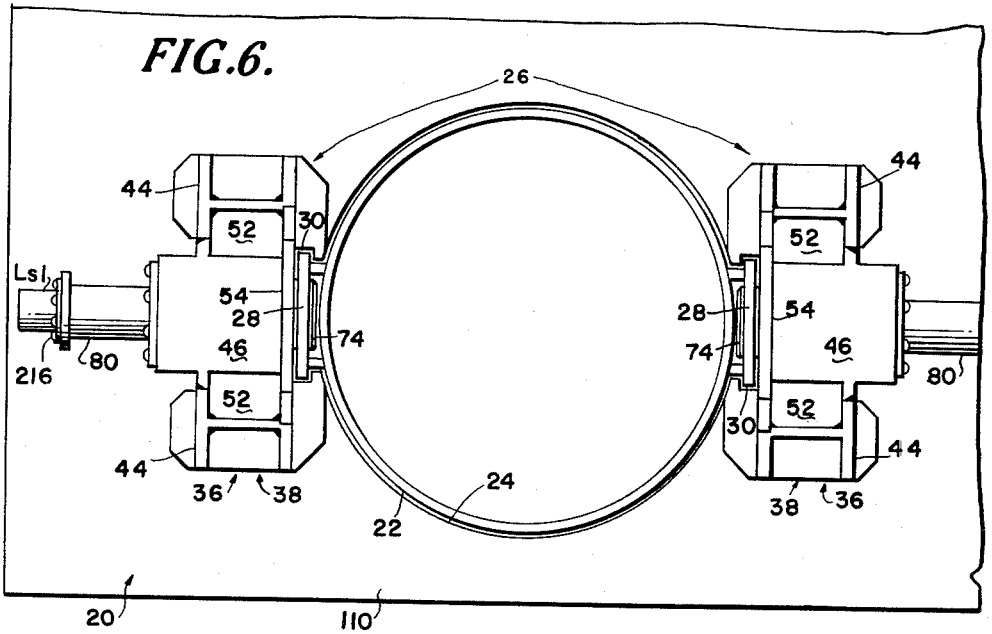
Figure 6 is an enlarged fragmentary plan view of a portion of Figure 1 illustrating a single supporting leg and the jacking mechanism therefor, but omitting the quick-release mechanism.

Referring now to the drawings, there is shown in Figures 1 and 2 a buoyant body in the form of a barge 20 which is generally rectangular in plan view and equipped with a plurality of supporting legs 22. Four such legs 22 are shown in the drawings, one at each corner of the barge 20 for stably supporting the latter. Each supporting leg 22 extends through a vertical guiding opening or well 24 extending through the barge, as shown in Figure 3, so that the legs can move substantially vertically relative to the barge. The supporting legs 22 illustrated in Figures 1 and 2 are in the form of hollow cylindrical caissons which may be of the order of 6 feet in diameter and of the order of 150 feet or more in length. Each supporting leg 22 is movable vertically relative to the barge 20 by a jacking mechanism 26 fastened to the deck of the barge, and since all of the jacking mechanisms are identical, a description of one will suffice for all.

Figure 10:
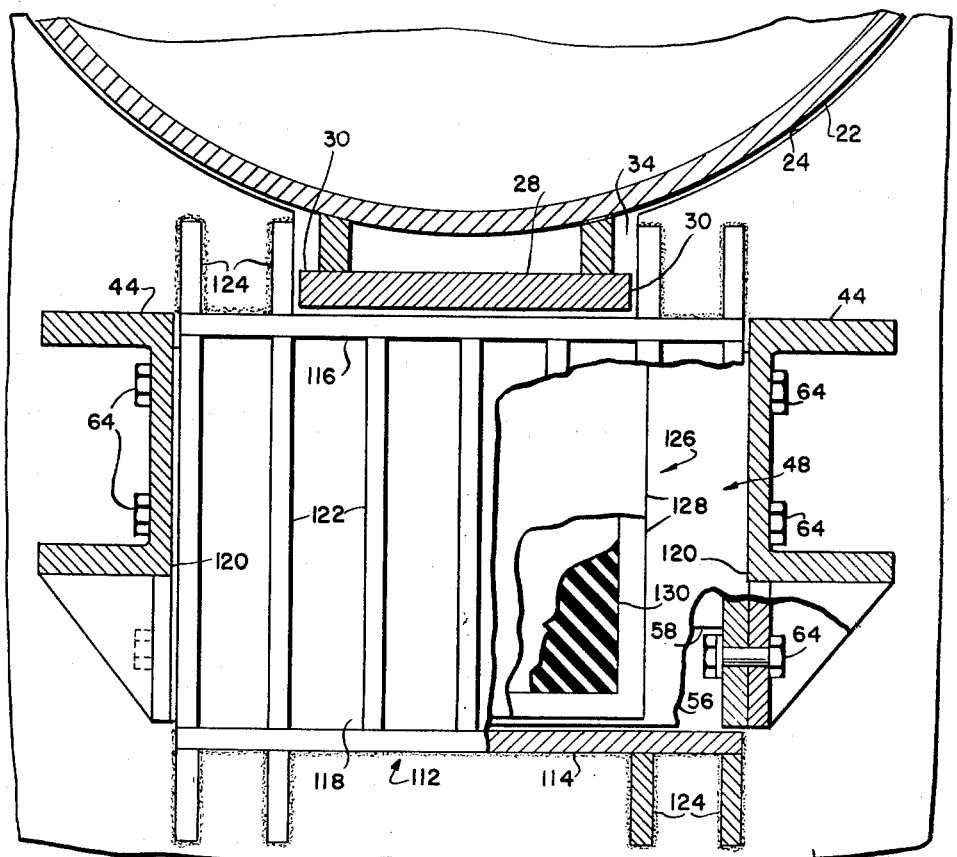
Figure 10 is an enlarged fragmentary sectional view taken substantially on line 10—10 of Figure 3, and with parts being broken away for clarity.
Figure 11:
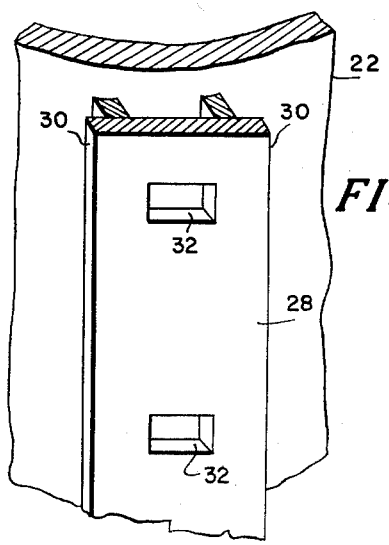
Figure 11 is an enlarged fragmentary perspective view of a portion of one of the supporting legs shown in Figure 1.

Each supporting leg 22 has welded thereto, on diametrically opposite sides thereof, a channel-shaped member 28. The free ends of the flanges of the channel-shaped member 28 are welded to the caisson 22, as best shown in Figures 10 and 11, while the web of the channel-shaped member projects beyond each of the flanges, to provide a guiding projection or rail 30, the utility of which will be described hereinafter. The web of each channel-shaped member 28 is provided with a vertically-extending series of uniformly-spaced, rectangular apertures of the series in one member 28 being aligned horizontally, or transversely, with the apertures in the series in the member on the opposite side of the leg 22. As shown best in Figure 10, the walls of the guiding wells 24 through the barge 20 are cut away on opposite sides, as at 34, to accommodate the channel-shaped members 28. It will also be seen that some clearance exists between the walls of the well 24 and the caisson 22, and also between the walls of the cut away portions 34 of the well and the channel-shaped members 28. Consequently, the caissons 22 are free to cant to a limited extent in their wells 24. In other words, the caissons 22 have a relatively loose fit in their wells 24 and are not tightly guided therein. A line extending diametrically of each caisson 22 through the centers of the two channel members 28 thereon extends athwartships of the barge 20 as is best shown in Figure 2. The reason for this preferable orientation of the channel-shaped members 28 will be described more fully hereinafter.

JACKING MECHANISM

Each jacking mechanism 26 includes two jacks 36, one operating on each channel-shaped member 28, that is, two jacks operable in unison are employed for each supporting leg 22 in the embodiment of the invention illustrated in Figures 1 and 2 of the drawings. Since all of the jacks 36 are identical, a description of one will suffice for all.

Figure 7:
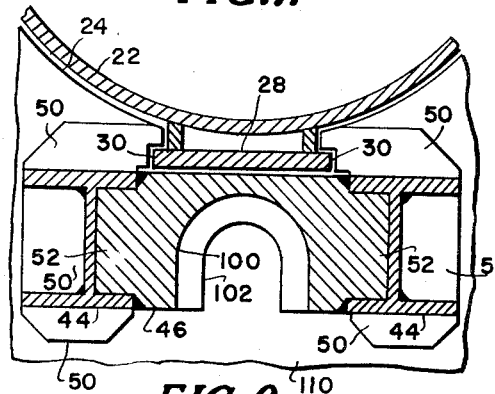
Figure 7 is a sectional view taken substantially on line 7—7 of Figure 4, but with the jacking motor being omitted for clarity.
Figure 8:
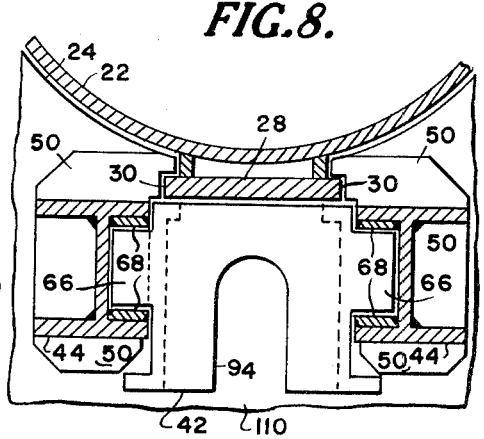
Figure 8 is a sectional view taken substantially on line 8—8 of Figure 4, but with the jacking motor being omitted for clarity.
Figure 9:
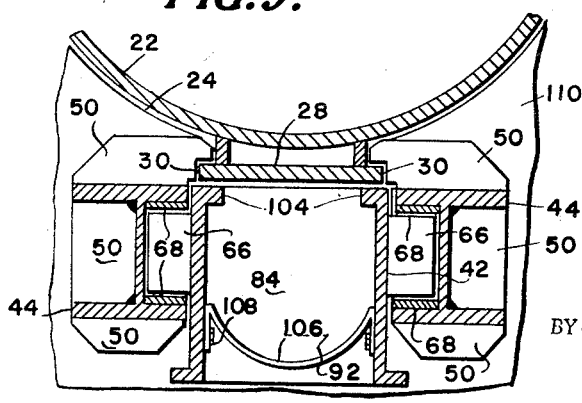
Figure 9 is a sectional view taken substantially on the line 9—9 of Figure 4, but with the jacking motor being omitted for clarity.
Figure 14:
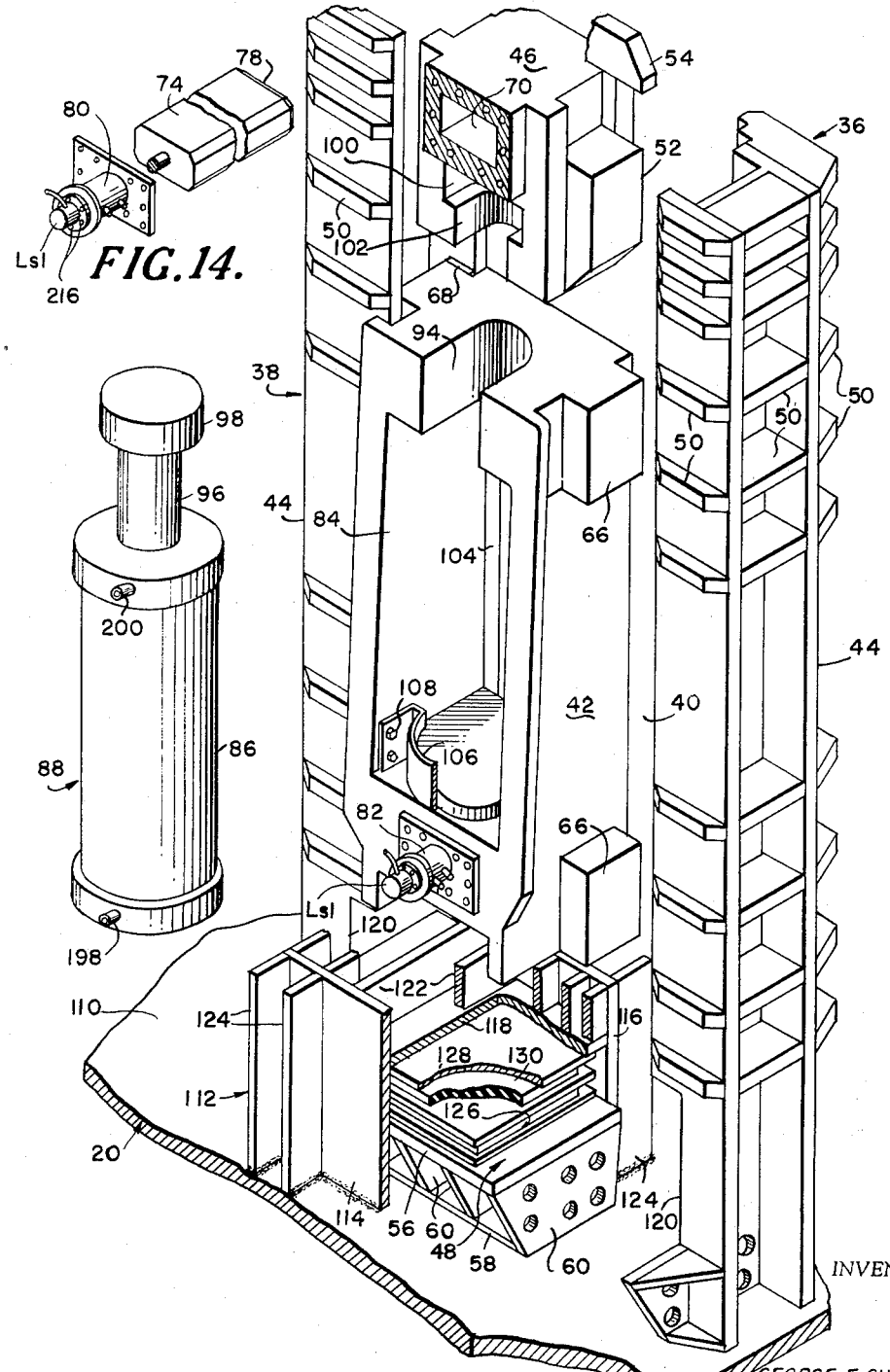
Figure 14 is a partially broken away, exploded perspective view of one of the jacks shown in Figure 3.

The jack 36 includes a vertically-elongated body 38 having a central longitudinally-extending aperture or slot 40 that is closed at both ends. For an appreciable distance of their length, the opposed longitudinal sides of the slot 40 constitute guideways for a slide 42 that is movable longitudinally of the jack body 38. In the embodiment shown herein the jack body 38 is formed in four parts, two spaced side members 44 which are formed of I beams, a top casting 46 which connects the I beams at the top of the jack body and closes the upper end of the slot 40 therein, and a lower abutment member 48 which connects the lower ends of the I beams together and closes the lower end of the slot. The faces of the top casting 46 and the slide 42 opposed to the caisson 22 are disposed in the same plane and are flat and smooth for bearing engagement against the web of the channel-shaped member 28 on the caisson. The I beams 44 preferably are reinforced by a plurality of transverse stiffening plates 50 welded onto the exterior faces of the flanges of each beam and into the laterally outwardly facing channels of each beam, as best shown in Figure 14. The top casting 46 has lateral projections 52 that fit snugly within the opposed channels of the two beams 44 and are welded to the latter as is best shown in Figures 7 and 14, so that essentially the top casting is an integral part of the jack body 38. An upright reinforcing tie plate 54 extends across the upper surfaces of the top casting 46 and the beams 44 and is welded to both the casting and the beams. The bottom abutment member 48 of the jack is of a reinforced, hollow, box-like construction and includes top and bottom plates 56 and 58 connected by transversely extending stiffening ribs 60 which are intersected at right angles by stiffening plates 62, as shown in Figures 3 to 5 and 14. This bottom abutment member 48 bridges the lower ends of the two beams 44 and is detachably secured thereto by bolts 64. The aforementioned guideways for the slide 42 are formed by the opposed channels of the beams 44 which receive lateral guiding projections 66 (Figures 8, 9, and 14) on the slide. Preferably, the guideways have wear plates 68 welded to the inner faces of the flanges of the beams 44 (Figures 5, 8, 9, and 14).

Extending transversely through the top casting 46, and through a lower portion of the slide 42, are two parallel pin-guiding bores 70 and 72 which are generally rectangular in cross section and positioned substantially normal to the web of the corresponding channel-shaped member 28 on the supporting leg or caisson 22. Reciprocable in the bores 70 and 72 are heavy load-carrying pins 74 and 76, respectively, which are substantially rectangular in transverse section and of a size to be received somewhat loosely within the apertures 32 in the channel-shaped member 28. Preferably, the forward edges of the pins 74 and 76 are beveled, as at 78, to facilitate their insertion into the apertures 32. The pins 74 and 76 are operated by double-acting reciprocating fluid motors, 80 and 82, bolted to the top casting 46 and to the slide 42, respectively. When retracted, the forward ends of the pins 74 and 76 are substantially flush with the faces of top casting 46 and of the slide 42 which are opposed to the caisson 22, and when extended the pins will project through an aperture 32 when aligned therewith.

The slide 42 is provided with a central longitudinally-elongated recess or slot 84 to accommodate the upright cylinder 86 of a double-acting reciprocating jacking fluid motor 88. The cylinder 86 is fixed against vertical movement relative to the slide 42 by engagement with the upper and lower or end walls 90 and 92, respectively, of the slot 84, while the upper end of the slide is notched, as at 94, to freely receive the piston rod 96 of the motor 88. The free end of the piston rod 96 is provided with an enlarged cylindrical head 98 disposed in a corresponding recess 100 in the top casting 46 of the jack body 38, which recess is provided with a notch 102 in its lower wall to accommodate the piston rod 96. Thus, the piston rod 96 is fixed to the jack body 38 against vertical relative movement. The cylinder 86 is retained in place in the slide 42 by engagement with inwardly-extending side flanges 104 at the back of the slot 84 and by an arcuate bracket 106 secured to the slide at the opposite sides of the front of the slot, as by cap screws 108. From the foregoing construction, it will be seen that by appropriate operation of the motor 88, the slide 42 can be caused to be moved vertically in either direction on the jack body 38.

The stiffening plates 50 on that side of the I beams 44 which face the supporting leg or caisson 22 extend over the rails 30 on the channel-shaped member 28, so that the jack body 38 is secured to the caisson for relative vertical sliding movement therebetween. Preferably some clearance exists between the opposed faces of the jack body 38 and slide 42 and of the web of the channel-shaped member 28, and also between the guiding edges of the stiffening plates 50 and the corresponding edges of the rails 30. Essentially, the interfitting engagement of the jack body 38 and the channel-shaped member 28 constitute a somewhat loose dovetail joint.

The jack body 38 is secured to the deck 110 of the barge 20 by a yoke structure 112, of inverted, generally U-shaped configuration, comprising upstanding front and rear plates 114 and 116, respectively, which are welded to the deck and positioned on opposite sides of the abutment member 48, and an abutment plate 118 extending in spaced relation over the member 48 and connecting the front and rear plates 114 and 116. The inner flanges of the beams 44 are cut away, as at 120, to accommodate the plates 118. Preferably, the abutment plate 118 is backed by transversely extending stiffening ribs 122, while the upstanding front and rear plates 114 and 116 are reinforced, adjacent their ends, by upstanding stiffening ribs 124. Interposed between the abutment member 48 and the abutment plate 118 of the yoke 112 is a shock absorbing and cushioning assembly 126, here shown as a stack of alternating flat metal sheets 128 and rubber cushioning blocks or pads 130. The assembly 126 also serves to equalize the loads on the two jacks 36 constituting a jacking mechanism 26 for a single supporting leg 22. Positioned on the deck 110 centrally beneath the bottom plate 58 of the abutment member 48 is an upwardly-facing, convex thrust bearing member 132, while a complementary downwardly-facing concave bearing member 134 is secured to the lower plate 58 of the abutment member 48 for engagement with the thrust bearing member mounted on the deck. It will be seen that with this securement of the jack 36 to the barge 20, the jack is free to cant with the caisson 22 whether the jack is thrusting against the deck 110 or pulling up against the yoke structure 112.

From the construction thus far described, it will be seen that when the jack body pins 74 of both jacks 36, constituting a single jacking mechanism 26, are engaged with the apertures 32 in the corresponding channel-shaped members 28 of the supporting leg or caisson 22, and the slide pins 76 are disengaged from the apertures, the jacking motors 88 of both jacks may be operated to move their slides 42 up or down relative to the jack bodies 38 into a position near the end of the stroke of the motors or the slides wherein the slide pins 76 can be moved into engagement with the apertures. When the slide pins 76 are engaged in the apertures 32, the jack body pins 74, when the load is removed therefrom, may be disengaged from their apertures. Thereupon, operation of the motors 88 to effect movement of the slides 42 in the opposite direction will forcefully effect relative vertical movement between the supporting leg 22 and the barge 20. It thus will be seen that the jacking mechanism 26 can be operated to forcefully effect step-by-step relative vertical movement in either direction between the supporting leg 22 and the barge 20. Of course, in such an operation, the jacks 36 on opposite sides of the supporting leg 22 will be operated in unison.

In operation of a barge equipped with jacking mechanisms of the foregoing type, the barge is towed to an erection site with the supporting legs held up out of engagement with the marine bottom, normally in a position wherein the lower ends of the supporting legs are substantially flush with, or project only a short distance below, the bottom of the barge. The supporting legs may be held up in such a position by engagement of the jack body pins 74 of the corresponding jacking mechanisms with the legs, while the slide pins 76 may be disengaged. Hence, the weight of each leg 22 is transferred through its jack bodies 38 and their thrust bearings 132 and 134, to the deck of the barge 20. When an erection site has been reached, the legs 22 are moved down into engagement with the marine bottom 136 (Figure 1), and it is highly desirable to accomplish such movement by releasing all the legs 22 to drop free substantially simultaneously, so that they will all fall rapidly, without any fall-hindering engagement with the barge, into upstanding engagement with the marine bottom.

Figure 12:
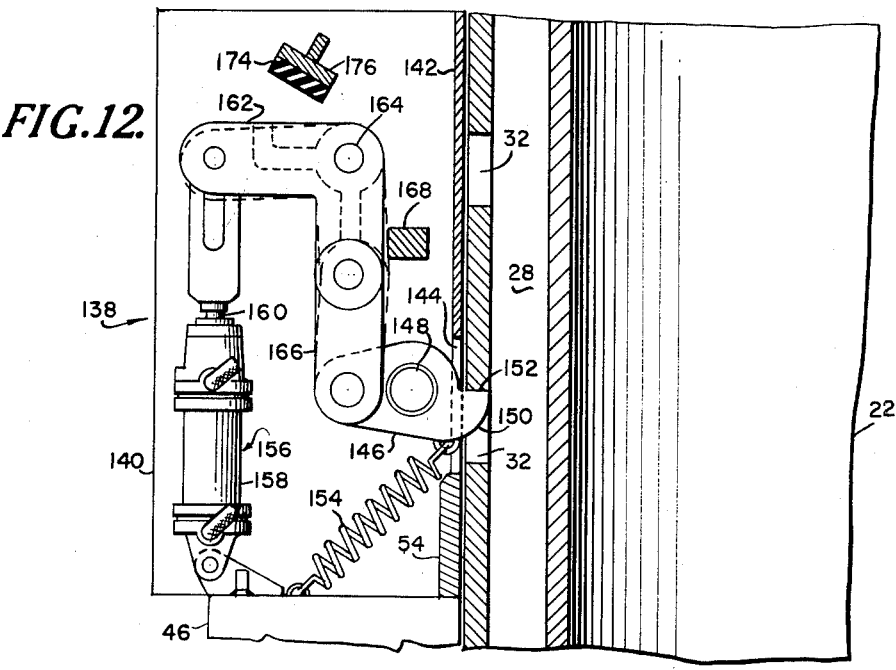
Figure 12 is an enlarged fragmentary vertical sectional view of a portion of Figure 3 to illustrate details of the quick-release mechanism.
Figure 13:
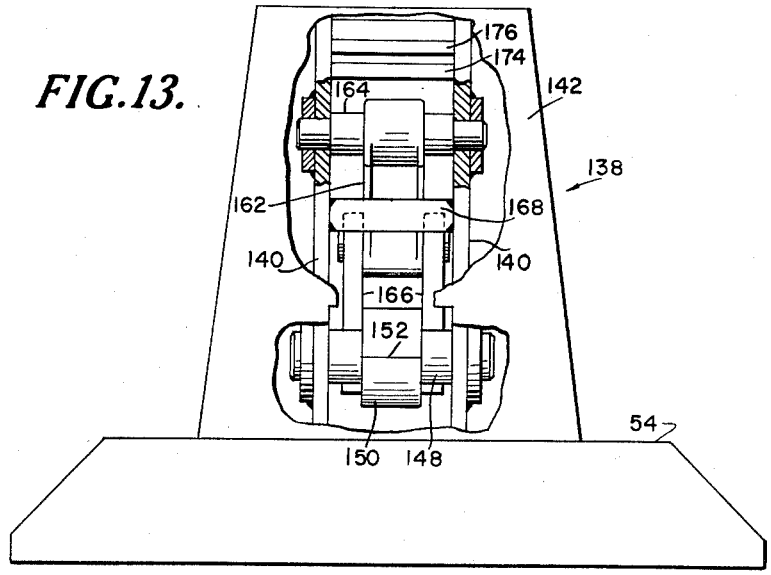
Figure 13 is a rear elevational view, partially broken away, of the mechanism shown in Figure 12.

The pin operating motors 80 and 82, however, normally are not of sufficient power to withdraw the pins 74 and 76 from the apertures 32 when a load is on the pins, as for example when the barge is under tow as described above and the weight of each caisson or leg 22 is supported on the jack body pins 74. Even if the pin operating motors 80 and 82 were powerful enough to withdraw their pins 74 and 76 when a load is thereon, it will be seen that at substantially the moment of disengagement of the pins from their corresponding apertures 32 in the channel-shaped members 28 on the leg 22, probably some metal would be shaved off either from the pins or from the edges of the apertures, if the pins were under load at the moment of withdrawal. Mechanism for avoiding this difficulty and for temporarily supporting the caissons or supporting legs 22 independently of the jack pins 74 or 76 and then quickly releasing the support of such caissons, without any chipping or shaving of metal, so that the caissons will fall free, is mounted on each of the jacks 36 as is best shown in Figures 3, 12, and 13.

QUICK-RELEASE MECHANISM

Such mechanism, which may be termed a quick-release mechanism 138, is disposed in a three-sided housing mounted on top of the jack body 38. The housing is formed by a pair of upstanding, laterally spaced plates 140 positioned substantially parallel to the direction of movement of the pins 74 and 76 and an upstanding plate 142 disposed substantially flush with the face of the top casting 46 opposed to the caisson 22 and having a substantially rectangular aperture 144 therein. A lever 146 is mounted for pivotal movement on a pivot pin 148 transversely spanning and supported by the plates 140. One end of the lever 146 is provided with a finger 150 having a flat surface 152 that is substantially horizontal when the lever is in the position shown in Figure 12, and in such position the surface 152 engages with the upper edge of one of the series of apertures 32 in the channel-shaped member 28. The vertical spacing between the finger surface 152, when horizontal, and the upper surface of the jack body pin 74 is slightly greater than the vertical spacing between the centers of adjacent apertures 32, or a multiple of such spacing. Hence, when the lever 146 is rotated from the position shown in Figure 3, to the position shown in Figure 12, the finger 150 will engage and lift the caisson 22 slightly so that the load is removed from the jack body pin 74.

The lever 146 normally is maintained in its inactive position shown in Figure 3 by a coil tension spring 154 having one end thereof secured to the finger 150 and the other end thereof secured to the top of the jack body 38. Movement of the lever 146 to the caisson-supporting position shown in Figure 12 is accomplished by a single-acting fluid motor 156 having the cylinder 158 thereof pivotally mounted on the top of the jack body 38, and the piston rod 160 thereof pivotally connected to one arm of a bell crank lever 162 pivotally mounted on a pivot pin 164 transversely spanning and supported by the two plates 140. The other arm of the bell crank lever 162 is connected to the lever 146 by a pair of links 166.

When fluid under pressure is admitted to the fluid motors 156 of the quick-release mechanisms 138 of both jacks, the bell crank levers 162 thereof are rotated from the position shown in Figure 3 to the position shown in Figure 12 thus pivoting the fingers 150 of the levers 146 into engagement with and slightly raising the caisson 22 so that it will be supported entirely by the quick-release mechanisms and will thereby relieve the load on the jack body pins 74 of the two jacks. It will be seen from the construction illustrated in Figure 12 that the toggle arrangement effected by the links 166 and the corresponding arm of the bell crank lever 162 goes somewhat past dead center on operation of the fluid motor 156, until the bell crank lever engages with a transverse stop member 168 spanning and secured to the two plates 140. Thus, the weight of the caisson 22 serves to lock the toggle arrangements so that full fluid pressure need not be maintained in the fluid motors 156 in order to support the caisson on the levers 146.

Figure 15:
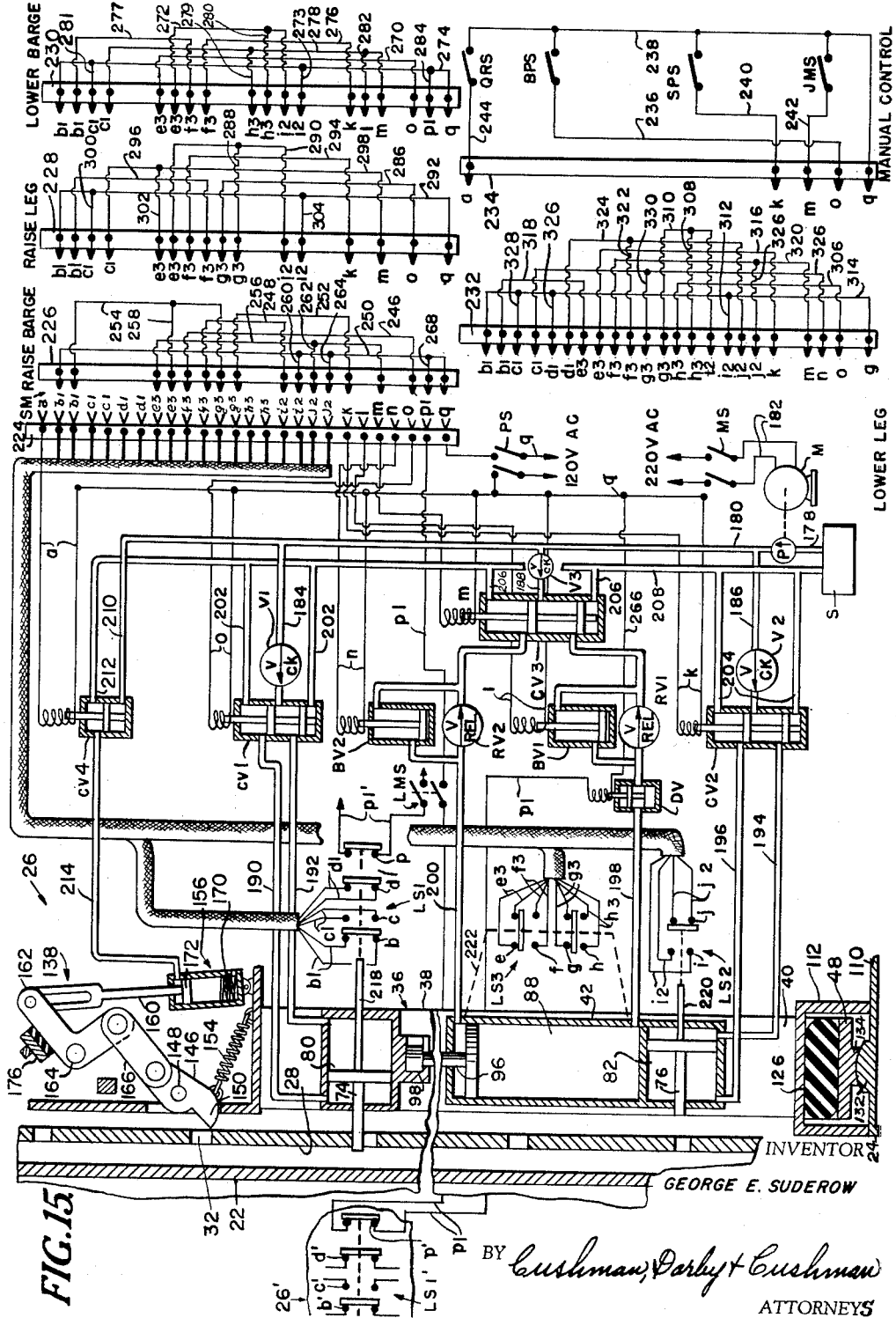
Figure 15 is a diagrammatic view of the hydraulic and electric controls for a single one of the jacking mechanisms shown in Figure 1.

Referring now to Figure 15, it will be seen that the fluid motor 156 includes a coil compression spring 170 interposed between one end of the cylinder 158 and its piston 172. Hence, when fluid pressure is exhausted from the motor 156, the spring 170 tends to rotate the bell crank lever 162 in a direction to break the lock of the toggle arrangement. Therefore, when it is desired to drop a caisson 22, fluid pressure is exhausted from the motors 156 of the quick-release mechanisms 138 and the springs 170 then immediately break the toggle locks so that the weight of the caisson 22 on the fingers 150 rapidly rotates the levers 146 back to the position shown in Figure 3 and permits the caisson to drop free. In this connection, it will be seen that the finger 150 rapidly rocks out of engagement with the upper edge of the aperture 32 in the channel-shaped member 28 on the caisson 22, so that no metal will be sliced or sheared off as the finger disengages. A resilient cushioning element 174 is secured to a stop member 176 spanning and secured to the two plates 140 in position to engage with an arm of the bell crank lever 162 and cushion its snap back from the position shown in Figure 12 to the position shown in Figure 3.

CONTROLS

The invention also includes controls for operating the jacking mechanisms 26 either automatically or manually. Such controls for a single jack 36 are shown schematically in Figure 15 of the drawings and include a source of fluid under pressure, such as a pump P which draws fluid from a sump S via a conduit 178 and discharges fluid into a supply conduit 180. The pump P may be driven by an electric motor M controlled by a switch MS connected into conductors 182 leading to a source of power, e.g., 200 v., 60 cycle A.C. The hydraulic motors 80, 82, and 88 are controlled by solenoid operated 4-way control valves CV1, CV2, and CV3, respectively, here shown as spool valves, although it will be realized that the motors can be controlled by any appropriate type of solenoid-operated control valve. The valves CV1, CV2, and CV3 are supplied with fluid under pressure from the supply conduit 180 via conduits 184, 186, and 188, respectively, having check valves V1, V2, and V3, interposed therein to prevent the back flow of fluid in case of failure of the pump P or the supply conduit. The opposite ends of the cylinders of the motors 80, 82, and 88 are connected to the valves CV1, CV2, CV3 by the supply or exhaust conduits 190 and 192, 194 and 196, and 198 and 200, respectively, while pairs of return flow or exhaust conduits 202, 204, and 206, respectively, connect the valves to a common return flow conduit 208 leading back to the sump S. The valves CV1 and CV2 are arranged so that when their operating coils are de-energized, the motors 80 and 82 are operated to extend the pins 74 and 76, while the control valve CV3 is so arranged that when its operating coil is de-energized, the motor 88 is operated to extend its piston rod 96, i.e., move the slide 42 down relative to the jack body 38.

Interposed in each of the conduits 198 and 200, which connect the motor 88 to the valve CV3, are adjustable relief valves RV1 and RV2, respectively, each arranged to normally block the exhaust of fluid through its corresponding conduit, for reasons later explained. The pressure relief valves RV1 and RV2 are by-passed by normally-open solenoid operated valves BV1 and BV2, respectively. The motor 156 of the quick-release mechanism 138 is controlled by a normally-open solenoid operated 2-way control valve CV4 which is connected to the supply and return flow conduits 180 and 208 via the conduits 210 and 212, respectively, and to the motor 156 by a conduit 214. When the coil of the valve CV4 is de-energized, the motor 156 is exhausted to the return flow conduit 208 so that the finger 150 is retracted.

All of the aforementioned solenoid operated valves can be controlled to automatically operate the jack 36 through a series of desired jacking cycles by limit switches LS1, LS2, and LS3 operated by the motors 80, 82, and 88 (or the slide 42), respectively. The limit switch LS1, which may be detachably mounted on the cylinder of the motor 80 as by screws 216, has three sets of contacts $b$, $c$, and $d$ adapted to be opened or closed by the motor 80 through an appropriate adjustable mechanism 218. The contacts $c$ are closed only when the pin 74 is completely withdrawn from the apertures 32 in the supporting leg 22, while the contacts $b$ and $d$ are closed only when the pin 74 is completely inserted into one of such apertures 32. The limit switch LS2 similarly may be detachably secured to the cylinder of the motor 82, and has two sets of contacts $i$ and $j$ adapted to be opened or closed by the motor 82 through an appropriate adjustable mechanism 220. The contacts $i$ are closed only when the pin 76 is completely inserted into one of the apertures 32 in the supporting leg 22, while the contacts $j$ are closed only when the pin 76 is completely withdrawn from such aperture. The limit switch LS3 may be mounted on the jack body 38 and is adapted to be tripped or operated adjacent each end of the stroke of the motor 88, i.e., adjacent each end of the travel of the slide 42, by an appropriate adjustable mechanism 222 associated with the slide. The limit switch LS3 includes four sets of contacts $e$, $f$, $g$, and $h$, the contacts $e$ and $g$ being closed only when the piston rod 96 is extended, i.e., the slide 42 is down, and the contacts $f$ and $h$ being closed only when the piston rod is retracted, i.e., the slide is up.

The conductors $b1$, $c1$ $d1$, $e3$, $f3$, $g3$, $h3$, $i2$, and $j2$ for the various limit switches LS1, LS3, and LS2, respectively, and one of the pair of conductors $a$, $o$, $n$, $m$, $l$, and $k$ of each of the energizing coils of the solenoid valves CV4, CV1, BV2, CV3, BV1, and CV2, respectively, all lead to an appropriate switching mechanism SM adapted to selectively interconnect the various conductors with an appropriate source of current, such as the conductors $q$ leading to 120 v. A.C. and controlled by a switch PS, to form a desired circuit for accomplishing a selected one of a plurality of types of jacking cycles. Although any appropriate switching mechanism SM may be employed, as shown herein this switching mechanism may include a receptacle type switchboard 224 into which one of a plurality of different wiring strips 226, 228, 230, 232, and 234 may be plugged, depending upon the particular jacking cycle to be accomplished. One of the power conductors $q$ is connected to a receptacle on the board 224, while the other power conductor $q$ is connected to a common conductor $q$ to which one of the conductors $q$, $o$, $n$, $m$, $l$, and $k$ of the coils of the solenoid valves are connected.

Although the controls illustrated in Figure 15 are shown and described as being connected to a single jack 36 and a single quick-release mechanism 138, instead of to all of the jacks and quick-release mechanisms which comprise a jacking mechanism 26 for operating on a single supporting leg 22, it will be realized that the corresponding pressure fluid motors of all of the jacks and quick-release mechanisms, constituting an entire jacking mechanism for operating on a single leg 22, are connected in parallel with the corresponding supply or exhaust conduits 214, 190, 192, 198, 200, 194, and 196 while the corresponding contacts of all the corresponding limit switches LS1, LS2, and LS3 are connected in series. Hence, in describing the operation of the controls, reference will be made to a single jack only.

Manual operation

Assuming first of all that the barge 20 is being towed to an erection site, the caisson 22 will be in an elevated position, as previously described, and supported by the jack body pin 74, as shown in Figure 15. During this operation, the "manual operation" wiring strip 234 preferably is plugged into the switchboard 224 for manual operation of both the jack and the quick-release mechanism 138. In this arrangement, the solenoid valves CV1, CV2, CV3, and CV4 are controlled by manually operable switches BPS, SPS, JMS, and QRS, respectively. Thus, the energizing coil of the solenoid valve CV1 and the manually operable control switch BPS therefore are connected in series with the source of power via conductors $q$, $o$, 236, and 238; the energizing coil of the solenoid valve CV2 and its manually operable control switch SPS are connected in series with the source of electric power via conductors $q$, $k$, 240, and 238; the energizing coil of the solenoid valve CV3 and its manually operable control switch JMS are connected in series with the source of electric power, via conductors $q$, $m$, 242, and 238, while the energizing coil of the solenoid valve CV4 and its manually operable control switch QRS are connected in series with the source of electric power via conductors $q$, $a$, 244, and 238.

As stated before, while the barge is being towed to an erection site, the pin 74 is engaged with the supporting leg 22 and the finger 150 of the quick-release mechanism 138 is disengaged therefrom. Hence the pump P may be stopped and the power switch PS opened. Consequently, the solenoid valves CV1, CV2, CV3, and CV4 are all de-energized and all of the manually-operable switches QRS, BPS, SPS, and JMS are open. During a tow, the piston rod 96 of the motor 88 normally is fully extended, i.e., the slide 42 is in its down position, and the pin 76 is retracted.

Drop legs

On reaching an erection site, the pump P is turned on, the power switch PS closed, and the switch SPS closed to energize the coil of the solenoid valve CV2 and operate the motor 82 to retract the pin 76, if not retracted therebefore. Thereupon, the switch QRS is closed to energize the coil of the valve CV4 and thereby operate the motor 156 to move the finger 150 into engagement with an aperture 32 in the supporting leg 22 and raise the latter slightly to remove the weight of the supporting leg from the pin 74. The switch BPS is then closed, thereby energizing the operating coil of the valve CV1 to operate the motor 80 to withdraw the pin 74, leaving the leg 22 freely supported only by the quick-release mechanism 138. The switch QRS is then opened, thereby de-energizing the coil of the solenoid vlave CV4 and exhausting fluid from the motor 156 of the quick-release mechanism. Hence, the finger 150 will snap out of engagement with the leg 122 and allow the latter to drop free of any fall-hindering engagement until it hits the marine bottom 136 and probably becomes embedded therein, as shown in Figure 1.

At this time, the pressure to the motors 80, 82, and 88 is shut off, by opening the switch MS and the power shut off by opening the switch PS, while substituting the "raise barge" wiring strip 226 for the "manual operation" wiring strip 234. After such substitution, the switches MS and PS are closed to re-energize the controls.

Raise barge

The wiring strip 226 serves to interconnect the limit switches LS1, LS2 and LS3 and the coils of the solenoid valves CV1, CV2, and CV3 in such a manner that the jack 36 will automatically recycle in a manner to raise the barge 20 on the leg 22. It will be noted that during this operation, the solenoid valves VB1 and VB2 are inoperative, i.e., constantly remain open, and that the contacts $c$ and $d$ of the limit switch LS1 and the contacts $h$ of the limit switch LS3 do not enter into any circuit.

When the wiring strip 226 is plugged into the switchboard 224, the pins 74 and 76 are withdrawn from the leg 22, so that the contacts $b$ of limit switch LS1 are open and contacts $c$ are closed, and the contacts $i$ of the limit switch LS2 are open and contacts $j$ closed, and the slide 42 is in its down position so that the contacts $e$ and $g$ of the limit switch LS3 are closed and the contacts $f$ are open.

The wiring strip 226 serves to form an energizing circuit for the coil of the valve CV1, via conductors $q$, $o$, 246, $f3$, contacts $f$ of the limit switch LS3, the conductors 248 and $i2$, the contacts $i$ of the limit switch LS2, and the conductors 260 and 250. Since the contacts $f$ and $i$ are open, the energizing circuit for the coil of the valve CV1 is interrupted, so that the motor 80 operates to extend the pin 74 into engagement with the leg 22.

The wiring strip 226 also serves to form an energizing circuit for the coil of the valve CV2, via conductors $q$, $k$, 252, $g3$, contacts $g$ of the limit switch LS3, conductors 254 and $b1$, contacts $b$ of the switch LS1 and conductor 250. Since, as stated above, the contacts $b$ are open, the coil of the valve is de-energized so that the motor 82 moves the pin 76 into engagement with the member 28 on the leg 22.

The wiring strip 226 also serves to form an energizing circuit for the coil of the valve CV3 via conductors $q$, $m$, 256, and $e3$, the contacts $e$ of the limit switch LS3, conductors 258, 254, and $b1$, contacts $b$ of the limit switch LS1 and the conductor 250. Additionally, this circuit also includes the contacts $j$ of the limit switch LS2 connected in parallel with the series connection of the contacts $e$ and $b$ via conductors 250, 264, $j2$, 262, and 256. Since, as stated above, the contacts $j$ are closed, the coil of the valve CV3 is energized to thereby operate the motor 88 to move the slide 42 up relative to the jack body 38.

When the leg 22 is dropped from the barge 20 into engagement with the marine bottom 136, there will be no assurance that one of the series of apertures 32 in the leg 22 will be in alignment with either of the pins 74 or 76. Nevertheless, the jack will automatically seek an aperture, since as the slide 42 moves up, the pin 76 slides along the member 28 until the pin becomes aligned with an aperture 32 and is projected thereinto, thus tripping the limit switch LS2 to close its contacts $i$ and open its contacts $j$. The opening of the contacts $j$ interrupts the energizing circuit for the coil of the valve CV3 so that the motor 88 operates to move the slide 42 down, i.e., extend the piston rod 96 and thereby exert a force to lift the barge 20 on the leg 22 or drive the latter into the marine bottom 136, since the pin 76 is engaged with the leg 22.

As the jack thereby moves the leg 22 down relative to the barge 20, or moves the latter up relative to the leg, the pin 74 slides along the member 28 until the pin 74 becomes aligned with an aperture 32 therein and is projected thereinto, thus tripping the limit switch LS1 to close its contacts $b$. Since the contacts $e$ are closed, the closing of the contacts $b$ completes the energizing circuit for the coil of the valve CV3 to thereby operate the motor 88 to move the slide 42 up relative to the jack body 38. At the same time, the closing of the contacts $b$ serves to energize the coil of the valve CV2, because the contacts $g$ of the limit switch LS3 are also closed, thereby operating the motor 82 to withdraw the pin 76 from the leg 22. Such withdrawal will not take place, however, until the load of the barge on the leg 22 is transferred to the pin 74. At that time, the pin 76 will withdraw from the leg 22, thereby tripping the limit switch LS2 to open its contacts *i* and close its contacts *j*.

The slide 42 will continue to move up and as it approaches the end of its upstroke, it trips the limit switch LS3 to thus open the contacts *e* and *g* and close the contacts *f*. Opening of the contacts *g* interrupts the energizing circuit of the coil of the valve CV2 so that the motor 82 operates to extend the pin 76 into engagement with the member 28 on the leg 22. Continued upward movement of the slide serves to register the pin 76 with an aperture 32 so that the pin is projected thereinto, thus tripping the limit switch LS2 to close its contacts *i* and open its contacts *j*.

Opening of the contacts *j* interrupts the energizing circuit of the coil of the valve CV3 to thereby operate the motor 88 to move the slide down relative to the jack body 38 to thereby lift the barge 20 on the leg 22. At the same time, the closing of the contacts *i* completes the energizing circuit for the coil of the valve CV1 so that the motor 80 is operated to withdraw the pin 74, which action will occur as soon as the load is transferred to the pin 76.

As the jack 36 approaches the end of its barge-lifting stroke, the limit switch LS3 is tripped by the mechanism 222 to thereby open the contacts *f*, and close the contacts *e* and *g*. Opening of the contacts *f* opens the aforementioned energizing circuit of the coil of the valve CV1, so that the valve will operate the motor 80 to extend the pins 74 into engagement with the web of the member 28 on the leg 22. Since the jacking motor 88, however, is still acting to raise the barge 20, the pin 74 will slide upwardly along the member 28 until the pin becomes aligned with an aperture 32 in such member. At that time the pin 74 will enter into the aperture 32 and thereby trip the limit switch LS1 to close its contacts *b*. Closing of the contacts *b* completes the energizing circuit for the coil of the valve CV3, so that the latter operates the jacking motor 88 to retract its piston rod 96, i.e., move the slide 42 up. Tripping of the limit switch LS1 also completes the energizing circuit for the coil of the valve CV2, so that the latter operates the motor 82 to retract the pin 76. The pin 76 will not retract, however, until the load thereon has been relieved, which is accomplished by the action of the jacking motor 88 to move the slide 42 up, i.e., to move the two pins 74 and 76 relatively toward each other, thereby transferring the load constituted by a portion of the weight of the barge 20 to the jack body pin 74. When this occurs, the motor 82 will retract the slide pin 76 and thus trip the limit switch LS2 to open its contacts *i* and close its contacts *j*.

Consequently, the jacking motor 88 continues to retract the piston rod 96 and thus to move the slide 42 up into a position for another barge-lifting stroke, while the barge is supported on the leg 22 by the pin 74, until the limit switch LS3 is tripped near the end of the upward stroke of the slide. Hence, the jacking mechanism 26 will continue to recycle to raise the barge 20 automatically in a step-by-step fashion as long as the wiring strip 226 is plugged into the switchboard 224 and the switches MS and PS are closed.

The above barge-raising cycling of a single jacking mechanism 26 cannot serve to raise the barge 20 on a plurality of supporting legs 22, and it is necessary for all of the several jacking mechanisms to be operated through barge-raising cycles in order to lift the barge. When all of the supporting legs initially are dropped into engagement with the marine bottom 136 while the barge 20 is afloat, as described heretofore, the several legs 22 will penetrate the marine bottom at various depths. Accordingly, the series of pin-receiving apertures 32 in the several legs 22 will not be in horizontal alignment. Hence, some means must be provided for operating certain of the jacking mechanisms 26 in unison in a manner so that they will lift the barge together and thus maintain the barge 20 substantially level while it is being raised on the several legs 22.

For this purpose, the controls of the two jacking mechanisms 26 at each end of the barge may be linked together for operation of the two jacking mechanisms in unison in a manner to assure that they will lift the corresponding end of the barge uniformly and not permit such end to get out of level appreciably. In a modified form of construction, not shown, each corner of the barge 20 may be provided with two supporting legs 22 and the controls for the jacking mechanisms 26 for each of such two supporting legs are linked together in an identical manner.

For this purpose, the jacking motors of both mechanisms 26 are supplied with pressure fluid from a common source of supply, e.g., the conduit 180. Additionally, all sets of linked jacking mechanisms are supplied with pressure fluid from such source. Preferably, however, the pressure supplied to each set of linked jacking mechanisms can be individually controlled, as by appropriate valve means (not shown) in order to control the rate of operation of each such set for the purpose of maintaining the barge level.

Thus, for example, referring again to Figure 15, there is shown at the left hand side thereof a portion of a jacking mechanism 26' which is to be operated in unison with the jacking mechanism 26. The jacking mechanism 26' includes a limit switch LS1' corresponding to the limit switch LS1 of the jacking mechanism 26. The limit switch LS1' includes a set of contacts *p'* which are closed when the corresponding jack body pin (not shown) of the jacking mechanism 26' is completely engaged within an aperture in its corresponding supporting leg (not shown). Similarly, the limit switch LS1 includes a set of contacts *p* which are closed only when the jack body pin 74 is completely engaged within an aperture 32 in the supporting leg 22. The conduit 198 which supplies pressure fluid to the jacking motor 88 when the latter is being operated to act to lift the barge 20, has a normally-open solenoid shut-off valve DV interposed therein. An energizing circuit for the coil of the valve DV is formed by the conductors *q*, 266, *p1*, the contacts *p'* of the limit switch LS1', and the conductors 268 and 250.

From the foregoing construction, it will be seen that when both of the jacking mechanisms 26 and 26' are operating to lift the barge, the jacking mechanism 26' may approach the end of its lifting stroke before the jacking mechanism 26 approaches the end of its lifting stroke. Hence, when the jacking mechanism 26' trips its slide-operated limit switch and so engages its corresponding jack body pins with the corresponding leg, and the jacking mechanism 26' starts to recycle, i.e., move all of its slides up in preparation for another barge-lifting step, the contacts *p'* will be closed to thereby energize the coil of the valve DV to close the latter and stop further flow of pressure fluid to the motors 88 of the jacking mechanism 26. Consequently, the lifting stroke of the jacking mechanism 26 will be stopped until such time as the jacking mechanism 26', has completely recycled, i.e., re-engaged its slide pins and retracted its jack body pins in preparation for another barge-lifting stroke. At that time, the contacts *p'* open and thus de-energize the coil of the valve DV so that the lifting stroke of the jacking mechanism 26 will resume simultaneously with the beginning of the next lifting stroke of the jacking mechanism 26'. In this connection, it is pointed out that the recycling time of the mechanism 26' is very short because its jacking motors need lift only the weight of their cylinders and the corresponding slides. The controls of the jacking mechanism 26' are linked to the controls of the jacking mechanism 26, in the same manner, i.e., by means of a normally-open solenoid valve DV' (not shown) interposed in the conduit 198' (not shown) supplying lifting-stroke pressure fluid to the jacking motors 88' (not shown) of the jacking mechanism 26', and controlled by the contacts p of the limit switch LS1 which are connected in series with an energizing circuit for the valve DV', via conductors p1'. With this arrangement, when the jacking mechanism 26 approaches the end of its lifting stroke before the mechanism 26', and trips its limit switch LS3 so that its jack body pins 74 become engaged with the leg 22, the lifting stroke of the jacking mechanism 26' will be stopped until such time as the jacking mechanism 26 has recycled and starts another barge-lifting stroke. At that time, the jacking mechanism 26' will resume its barge-lifting stroke. Preferably a manually-operable switch LMS is interposed in the conductors P1 and P1' to selectively link or delink the jacking mechanisms 26 and 26'.

By means of the foregoing linking controls for sets of jacking mechanisms, it will be seen that the barge 20 can be raised substantially uniformly on all of its supporting legs 22. This result obtains because all of the sets of linked jacking mechanisms are supplied with pressure fluid from a common source of fluid under pressure, so that the lifting forces exerted by all of the sets of linked jacking mechanisms are substantially equalized. It will be realized that during the initial steps of lifting a barge on its supporting legs, in some instances the supporting legs will be forced downwardly into the marine bottom 136 at various penetrations until such legs reach a bearing sufficient to support their proportional share of the weight of the barge. Nevertheless, because of the aforedescribed force-equalizing effect of a common source of pressure fluid for operating the jacking motors 88 of the several sets of linked jacking mechanisms, the barge will remain substantially level until all of the supporting legs have reached a bearing in the marine bottom sufficient to support their proportional share of the total weight of the barge. At that time, the barge will be raised uniformly on all of the supporting legs.

In the event, however, that the barge becomes out of level because a set of linked jacking mechanisms begins to raise the barge at a somewhat faster rate than other sets of linked jacking mechanisms, the pressure supplied to the jacking motors of the more rapidly operating set of linked jacking mechanisms can be reduced, or the pressure supplied to the several sets of linked jacking mechanisms can be regulated differentially, in order to maintain the barge substantially level as it is being raised in a step-by-step fashion.

In this connection, it is pointed out that because the supporting legs 22 are free to cant to a limited extent in their guiding wells 24, the barge 20 can become out of level to a limited extent without binding the legs in their wells. In this same connection, it is also pointed out that because of the mounting of the various jacks 36 on the barge 20, the jacks 36 are free to cant with their corresponding legs 22 so that no binding action will occur between the jack pins 74 and 76 and the edges of their corresponding apertures 32 in their corresponding legs. It also is pointed out that when a barge 20 is being raised in a heavy sea, during the initial conversion of the barge 20 from a floating object to a platform which is supported on the legs 22, the jacking mechanisms 26 may be subject to heavy shocks caused by the lifting of a leg 22 with the barge 20, when the latter pitches or rolls, and the pounding of the leg 22 back down against the marine bottom. The aforementioned cushioning and shock-absorbing assembly 126, however, considerably cushions such shocks and relieves the various jacking mechanisms 26 of severe stresses and strains.

When the barge 20 reaches a desired elevation on its supporting legs 22, e.g., above wave action, the switches MS and PS of the several jacking mechanisms are opened to thus stop further barge-raising cycling thereof. In those instances wherein a jacking mechanism 26 is effecting a barge-lifting stroke, it will be seen that the barge 20 will be supported on the corresponding slide pins 76 because no back flow of fluid can take place between the motor 88 and the supply conduit 180, because of the check valve V3. In those instances wherein a jacking mechanism 26 is recycling, the barge will be supported on the corresponding jack body pins 74. In the event that the barge is somewhat out of level, the "manual control" wiring strip 234 can be substituted for the "raise barge" wiring strip 226 and by appropriate manipulation of the manual control switches JMS, SPS, and BPS, the barge can be leveled on all of its supporting legs.

As stated heretofore, it is desirable, when two jacks 36 comprise a jacking mechanism 26 operating on a single supporting leg 22, for the two jacks to be positioned on an athwartship line extending through such supporting leg. It readily will be seen that the side of an elongated barge or platform will present a greater area to be acted upon by wind and/or wave forces than an end of such platform. Consequently, the jacking mechanism 26 should be arranged to resist the greater force tending to make a supporting leg cant in its corresponding guiding well 24. The aforementioned "athwartship" positioning of two jacks 36 relative to a corresponding supporting leg, offers such increased canting resistance, and at the same time, when operating either to lift or to lower the barge 20 on the legs 22, actually tends to straighten the latter athwartship of its well 24 so as to minimize any possible binding action between the supporting leg and its well resulting from the leg being canted athwartship of the barge.

*Lower barge*

When it is desired to move the barge to another location, the "lower-barge" wiring strip 230 is plugged into the switchboard 224, and the switches PS and MS are closed. This operation will first be described with reference to the automatic cycling of a single jack 36 to lower the barge. In this connection, however, it will be realized that such description will encompass the "lower-barge" recycling of a jacking mechanism 26 which includes at least two jacks 36. In this operation, the by-pass valve BV2 is inoperative, i.e., remains open, while the limit switch contacts d, g, and j are not used.

At the beginning of this operation, it first will be assumed that the slide pin 76 is engaged in an aperture 32 in the leg 22 so that the contacts i of the limit switch LS2 are closed, the jack body pin 74 is retracted so that the contacts c of the limit switch LS1 are closed and the contacts b are open, and that the limit switch LS3 was tripped, prior to the stopping of the barge-lifting operation, to close its contacts f and h and open its contacts e.

The wiring strip 230 provides an energizing circuit for the coil of the solenoid valve CV1 via conductors q, o, 270, e3, the contacts e of limit switch LS3, conductors 272, i2, contacts i of limit switch LS2, and conductors 273 and 274. Since, as mentioned above, the contacts e are open, the valve CV1 initially is de-energized so that the motor 80 operates to move the pin 74 into engagement with the member 28 on the leg 22.

The wiring strip 230 also forms an energizing circuit for the coil of the valve CV2, via conductors q, k, 276, f3, the contacts f of the limit switch LS3, conductor 277, b1, the contacts b of the limit switch LS1, and conductor 274. Since, as mentioned above, the contacts b initially are open, the coil of the valve CV2 remains de-energized so that the motor 82 maintains the pin 76 extended into an aperture 32 in the leg 22.

The wiring strip 230 also forms an energizing circuit for the coil of the valve CV3, via conductors q, m, 278, 279, h3, contacts h of limit switch LS3, conductors 280, 272, i2, contacts i of limit switch LS2, and conductors 273 and 274. The strip 230 also connects the contacts c of limit switch LS1 in parallel with the series connection of the aforementioned contacts h and i, via conductors 278, c1, 281, and 274. The strip 230 also connects the coil of the valve BV1 in parallel with the coil of the valve CV3, via conductors *q, l,* 282, and *m.* Because, as mentioned above, the contacts *b, h,* and *i* are closed, the coil of the solenoid valve CV3 is energized and operates the jacking motor to move the slide 42 up relative to the jack body 38, i.e., to move the barge 20 down on the leg 22. Furthermore, the coil of the valve BV1 is energized to thereby close the bypass valve BV1 and block flow through the conduit 198. Hence, fluid cannot be exhausted through the conduit 198 except through the pressure relief valve RV1. This valve is adjusted so that the proportional weight of the barge 20 exerted through the jack 36 does not develop sufficient pressure in the conduit 198 to open the pressure relief valve RV1. Hence, pressure must be applied to the jack motor 88 through the conduit 200 to move the barge 20 down relative to the supporting leg 22. Therefore, it will be seen that by controlling the pressure supplied through the conduit 188, the rate of lowering the barge 20 can be controlled. Furthermore, by means of this construction, whereby pressure fluid must be supplied to the jacking motor 88 in order to lower the barge, the lowering operation would automatically halt if the pump P should fail.

As the barge lowers, it will be seen that the jack body pin 74 will become aligned with an aperture 32 and be forced thereinto by the motor 80, thereby tripping the limit switch LS1 to close its contacts *b* and open its contacts *c*. Closing of the contacts *b* completes the energizing circuit for the coil of the valve CV2 so that the latter operates the motor 82 in a direction to retract the slide pin 76. The jacking motor 88 is continuing to lower the barge, however, so that when the weight thereof is transferred to the jack body pin 74, the motor 82 retracts the pin 76 and trips the limit switch LS2 to open its contacts *i*. Opening of the contacts *i* interrupts the energizing circuits for the valves CV3 and BV1, since the contacts *c* were previously opened. De-energization of the coil of the valve CV3 operates the motor 88 to lower the slide 42 relative to the jack body 38, i.e., to re-cycle the jack.

As the slide 42 approaches the end of its downward movement, it trips the limit switch LS3 to thereby close the contacts *e,* and open the contacts *f* and *h.* Opening of the contacts *f* interrupts the energizing circuit of the coil of the valve CV2 thereby operating the motor 82 to extend the slide pin 76 into engagement with the member 28. As the slide 42 continues to lower, the pin 76 becomes aligned with an aperture 32 and is forced therethrough, thereby closing the contacts *i* of the limit switch LS2. Closing of the contacts *i* completes the energizing circuit for the coil of the valve CV1, since the contacts *e* were previously closed, so that the motor 80 is operated in a direction to retract the pin 74. The pin 74 will not completely retract, however, until the weight of the barge is transferred to the pin 76. When this occurs, the pin 74 completely retracts, the contacts *b* of the limit switch LS1 are opened, and the contacts *c* are closed. Closing of the contacts *c* completes the energizing circuits for the coils of the valves CV3 and BV1 to thereby operate the jacking motor 88 to lower the barge through another step. When the jacking motor 88 nears the end of its barge-lowering stroke, the limit switch LS3 will be tripped to thereby open its contacts *e* and close its contacts *f* and *h.* Opening of the contacts *e* interrupts the energizing circuit for the coil of the solenoid valve CV1 to thereby operate the motor 80 to extend the pin 74 into engagement with the member 28, so that when the pin 74 becomes aligned with an aperture 32, it will be projected therethrough and thereby trip the limit switch LS1 to start another recycling operation of the jacking motor 88. Accordingly, the jack 36 will continue to recycle to lower the barge automatically on the leg 22 in a step-by-step fashion as long as the wiring strip 230 is plugged into the switchboard.

The foregoing description of an automatic barge-lowering operation was based on the assumption that the barge was initially supported by the slide pin 76 and that the jacking motor 88 had been stopped during barge-raising stroke. This might not be the case, and the barge might be supported on the jack body pin 74, and the jacking motor 88 may have been stopped during inactive re-cycling, i.e., when the slide 42 was moving up. If this situation exists, the jack body pin 74 will be fully extended; so that the contacts *b* of the limit switch LS1 are closed and the contacts *c* are open, the slide pin 76 will be completely retracted so that the contacts *i* of the limit switch LS2 are open, and the contacts *e* of the limit switch LS3 will be open while the contacts *f* and *h* are closed.

Consequently, when the wiring strip 230 is plugged into the switchboard 224, the energizing circuit for the coil of the valve CV1 will be interrupted, since the contacts *e* and *i* are open, so that the motor 80 will continue to be operated to extend the jack body pin 74. The energizing circuit for the coil of the valve CV2 will be completed, since the contacts *f* and *b* are closed, so that the motor 82 will continue to operate to maintain the slide pin 76 retracted. The energizing circuit for the coil of the valve CV3 will be interrupted, since the contacts *c* and *i* are open, so that the motor 88 will operate to move the slide 42 down relative to the jack body 38.

As the slide approaches the end of its downward movement, it will trip the limit switch LS3 to thereby close the contacts *e* and open the contacts *f* and *h.* Opening of the contacts *f* interrupts the energizing circuit for the coil of the valve CV2 to thereby operate the motor 82 to extend the slide pin 76 into engagement with the member 28. As the slide 42 continues to lower, the pin 76 becomes aligned with an aperture 32 and is projected therethrough, thereby tripping the limit switch LS2 to close its contacts *i*. Closing of the contacts *i* completes the energizing circuit for the coil of the valve CV1 to thereby operate the motor in a direction to retract the jack body pin 74. As soon as the load is transferred from the pin 74 to the slide pin 76, the motor 80 will completely retract the jack body pin 74 and thereby trip the limit switch LS1 to open the contacts *b* and close the contacts *c*. Closing of the contact *c* completes the energizing circuit for the coils of the valves CV3 and BV1. Consequently, the valve BV1 will close and the valve CV3 will operate the motor 88 to move the slide 42 up, i.e., lower the barge relative to the leg 22.

This stage of the operation corresponds exactly to a stage in the first-described barge-lowering operation. Consequently, the barge 20 will be lowered automatically in a step-by-step fashion as long as the wiring strip 230 is plugged into the switchboard 224.

The jacking mechanisms 26' and 26 are also linked together by the wiring strip 230 in a manner so that both jacking mechanisms may be operated in unison to lower the barge on the corresponding caissons. Thus, for example, if the jacking mechanism 26' should approach the end of its lowering stroke and thus trip its corresponding slide-operated limit switch before the jacking mechanism 26 approaches the end of its lowering stroke and trips the limit switch LS3, when the jack body pins of the jacking mechanism 26' become engaged with the corresponding supporting leg and the jacking mechanism 26' starts to recycle for another lowering stroke, the contacts *p'* of the limit switch LS1' are closed. The closing of these contacts completes the energizing circuit for the valve DV, via conductors *q,* 226, *p1,* the contacts *p',* conductors 284 and 274, to thereby close the valve DV. Hence, the valve DV prevents exhaust flow through the conduit 198 so that the lowering stroke of the motor 88 of the jacking mechanism 26 is stopped until the jacking mechanism 26' has recycled and begun another lowering stroke, at which time the contacts *p'* of the limit switch LS1' are re-opened to thereby open the valve DV and permit the jacking mechanism 26 to resume its barge-lowering stroke.

In like manner the linking contacts p of the limit switch LS1 will cause the jacking mechanism 26' to pause during a lowering stroke thereof while the jacking mechanism 26 is recycling in preparation for another lowering stroke thereof.

The aforedescribed lowering of the barge in a step-by-step fashion will continue until the barge is afloat. At that time, the switches PS and MS are opened to de-energize the controls.

*Raise leg*

When it is desired to raise a leg 22, the "raise leg" wiring strip 228 is plugged into the switchboard 224. For this operation, it will be seen that the bypass valves BV1 and BV2 are inoperative, i.e., remain open. It also will be seen that the contacts d of limit switch LS1, the contacts h of limit switch LS3, and the contacts j of limit switch LS2 are not used. When the wiring strip 228 is plugged into the switchboard, it will be assumed that the switches PS and MS were opened during a barge-lowering stroke of the jacking mechanism 26, i.e., at a time when the slide pin 76 is engaged with the leg so that the contacts i of the limit switch LS2 are closed, the motor 88 was operating the slide 42 to move the latter up relative to the jack body 38, so that the contacts e and g of the limit switch LS3 are closed and the contacts f are open, and the pin 74 is completely retracted, so that the contacts c of the limit switch LS1 are closed and the contacts b are open.

The wiring strip 228 forms an energizing circuit for the coil of the valve CV1 via conductors q, o, 286, g3, the contacts g of the limit switch LS3, conductors 288, 290, i2, the contacts i of the limit switch LS2, and conductors 304 and 292.

The wiring strip 228 also forms an energizing circuit for the coil of the valve CV2, via conductors q, k, 294, f3, the contacts f of the limit switch LS3, the conductors 296, b1, the contacts b of the limit switch LS1, and conductor 292.

The wiring strip 228 also forms an energizing circuit for the coil of the valve CV3, via conductors q, m, 298, 302, e3, contacts e of limit switch LS3, conductors 290, i2, contacts i of limit switch LS2, and conductors 304 and 292. The strip 228 also connects contacts c of the limit switch LS1 in parallel with the series connection of the contacts e of limit switch LS3 and the contacts i of the limit switch LS2, via conductors 298, c1, 300, and 292.

In accordance with the foregoing circuitry, it will be seen that the energizing circuit for the coil of the valve CV1 is completed, so that the motor 80 operates to maintain the pin 74 retracted. It also will be seen that the energizing circuit for the coil of the valve CV2 is interrupted so that the motor 82 operates to maintain the slide pin 76 extended. It also will be seen that the coil of the valve CV3 is energized and causes the motor 88 to operate to move the slide 42 up, thus pulling up the leg 22 because the slide pin 76 is engaged therewith.

As the slide 42 approaches the end of its upward stroke, it trips the limit switch LS3 to thereby open its contacts e and g and close its contacts f. Opening of the contacts g serves to interrupt the energizing circuit for the coil of the valve CV1, which accordingly operates the motor 80 to advance the jack body pin 74 into engagement with the member 28. The motor 88 continues to move the slide up, however, because the contacts c of the switch LS1 are still closed, until the jack body pin 74 becomes aligned with an aperture 32 in the leg 22 and is forced thereinto. This action trips the limit switch LS1, thus opening its contacts c and interrupting the energizing circuit for the coil of the valve CV3 to thereby cause the slide 42 to begin to lower. Simultaneously, the tripping of the limit switch LS1 serves to complete the energizing circuit for the coil of the valve CV2 to operate the motor 82 to withdraw the slide pin 76. The pin 76 will not withdraw, however, until the action of the motor 88 in lowering the slide 42 transfers the weight of the leg 22 to the jack body pin 74. At that time, the motor 82 will withdraw the slide pin 76 and thus trip the limit switch LS2 to open its contacts i.

The slide 42 will continue to move down until the limit switch LS3 is again tripped as the slide approaches the end of its lowering stroke. When the limit switch LS3 is so tripped, its contacts e and g will close and its contacts f will open, thus interrupting the energizing circuit for the coil of the valve CV2, so that the motor 82 will act to advance the slide pin 76 into engagement with the member 28 on the leg 22. The slide 42 will continue to lower, however, until the pin 76 is aligned with an aperture 32 in the leg 22 and is forced into such aperture, thereby tripping the limit switch LS2 to close its contacts i. This will energize the coil of the valve CV3, to cause the motor 88 to operate to move the slide 42 up and so lift the leg 22, and also energize the coil of the valve CV1 to thereby operate the motor 80 to retract jack body pin 74, after the weight of the leg 22 has been transferred to the slide pin 76. Thereupon, continued upward movement of the slide 42 will raise the leg 22 through another step, and the jacking mechanism 26 will continue to recycle and raise the leg 22 as long as the strip 228 is plugged into the switchboard.

The foregoing described cycling of the jacking mechanism 26 to raise a leg 22 was based on an assumption that when the wiring strip 228 was plugged into the switchboard 224, the jacking mechanism, and its several limit switches, were in the positions obtained during an interruption of a barge-lowering stroke of the jacking mechanism. Obviously, this situation may not necessarily obtain, and the jacking mechanism may be in the position wherein the jack body pin 74 is engaged with the leg 22, the slide pin 76 completely disengaged, and the slide 42 is being lowered in preparation for another barge-lowering stroke. Under these conditions, it will be seen that the contacts b of the limit switch LS1 are closed and the contacts c are open, the contacts i of the limit switch LS2 are open, the contacts e and g of the limit switch LS3 are open, and the contacts f are closed.

Accordingly, when the wiring strip 228 is plugged into the switchboard 224, the energizing circuit for the coil of the valve CV1 is interrupted, so that the motor 80 maintains the jack body pin 74 engaged with the leg 22, the energizing circuit for the coil of the valve CV2 is completed so that the motor 82 maintains the slide pin 76 retracted, and the energizing circuit for the coil of the valve CV3 is interrupted, so that the motor 88 continues to lower the slide 42 until the latter trips the limit switch LS3 as the slide approaches the end of its lowering stroke. This stage of the operation is identical to a stage in the previously-described leg-raising operation. Accordingly, it will be seen that the jacking mechanism 26 will recycle and raise the leg 22 as long as the wiring strip 228 is plugged into the switchboard.

Normally, the operation of raising the leg 22 will continue until its lower end is substantially flush with the underside of the floating barge 20. At that time, and preferably at a time when the jack body pin 74 is engaged with the leg, the switches MS and PS are opened so that the leg 22 remains supported by the jacking mechanism 26. In this connection, there is no need to link two or more jacking mechanisms 26 together, when raising the legs 22, as described heretofore with reference to raising and lowering the barge on the supporting legs 22, because the barge 20 is afloat and remains substantially level during the aforedescribed raising operation, even though all of the several jacking mechanisms are being operated simultaneously to raise their corresponding supporting legs. It will be realized, however, that in some instances, the jacking mechanisms 26 will exert a considerable downward thrust on the barge 20 when a substantial force is necessary to free the supporting legs 22 from the grip of the marine bottom. In this instance, due care must be taken by appropriate correlation of the leg-raising operation of the several jacking mechanisms 26 to prevent the barge 20 from becoming unduly out of level. If such an event were to occur, it might result in an extreme binding action between the legs 22 and their corresponding guiding wells 24.

Lower leg

In some instances, it may be desirable to lower a supporting leg 22 by means of the cycling of its corresponding jacking mechanism 26, instead of operating the quick-release mechanism 138 to support and then allow a particular supporting leg 22 to drop free. For this purpose the "lower leg" wiring strip 232 is plugged into the switchboard 224. It is assumed that when the wiring strip 232 is so plugged in, the leg 22 is being supported on the jack body pin 74, so that the contacts $b$ and $d$ of the limit switch LS1 are closed and the contacts $c$ are open; the pin 76 is retracted so that the contacts $j$ of the limit switch LS2 are closed and the contacts $i$ are open; and the slide 42 is in its down position so that the contacts $e$ and $g$ of the limit switch LS3 are closed and the contacts $f$ and $h$ are open.

The wiring strip 232 serves to form an energizing circuit for the coil of the valve CV1, via conductors $q$, $o$, 306, $h3$, contacts $h$ of limit switch LS3, conductors 308, 310, $i2$, contacts $i$ of limit switch LS2, and the conductors 312 and 314. Since the contacts $h$ and $i$ are open, the energizing circuit for the coil of the valve CV1 is interrupted so that the motor 80 maintains the pin 74 fully extended into engagement with the leg 22.

The wiring strip 232 forms an energizing circuit for the coil of the valve CV2 via conductors $q$, $k$, 316, $e3$, contacts $e$ of limit switch LS3, conductors 318, $b1$, contacts $b$ of limit switch LS1, and conductor 314. Since the contacts $e$ and $b$ are closed, the coil of the valve CV2 is energized so that the motor 82 serves to maintain the pin 76 fully retracted.

The wiring strip 232 forms an energizing circuit for the coil of the valve CV3, via conductors $q$, $m$, 320, $f3$, contacts $f$ of limit switch LS3, conductors 322, 324, $d1$, contacts $d$ of limit switch LS1 and conductors 326 and 314. It also will be seen that the wiring strip 232 connects the contacts $j$ of limit switch LS2 in parallel with the contacts $f$, via conductors $j2$, 320, and 324. Since the contacts $d$ and $j$ are closed, the coil of the valve CV3 is energized so that the motor 88 operates to move the slide 42 up relative to the jack body 38.

The wiring strip 232 also forms an energizing circuit for the coil of the bypass valve BV2 via conductors $q$, $n$, 326, 330, $g3$, contacts $g$ of limit switch LS3, conductors 310 and $i2$, contacts $i$ of limit switch LS2, and conductors 312 and 314. It also will be seen that the wiring strip 232 connects the contacts $c$ of limit switch LS1 in parallel with the series connection of contacts $g$ and $i$ via conductors 326, $c1$, 328, and 314. Since the contacts $c$ and $i$ are open, the coil of the bypass valve BV2 is de-energized so that flow can take place freely through conduit 200.

As the slide 42 approaches the end of its upstroke, it trips the limit switch LS3 to thereby open its contacts $e$ and $g$ and close its contacts $f$ and $h$. Opening of the contacts $e$ interrupts the energizing circuit for the coil of the valve CV2 so that the motor 82 operates to extend the slide pin 76 into engagement with the member 28 on the leg 22. The slide 42 will continue to move up, however, until the pin 76 becomes aligned with an aperture 32 and is projected thereinto thereby tripping limit switch LS2 to close its contacts $i$ and open its contacts $j$. The closing of the contacts $i$ completes the energizing circuit for the coil of the valve CV1 so that the motor 80 will operate to withdraw the jack body pin 74. This will not occur, however, until the weight of the leg 22 has been transferred to the slide pin 76. When the motor 80 retracts the jack body pin 74, the limit switch LS1 is tripped to thereby close its contacts $c$ and open its contacts $b$ and $d$. Opening of the contacts $d$ de-energizes the coil of the valve CV3 so that the motor 88 is operated to move the slide 42 down and thereby lower the leg 22 therewith.

In this connection, the closing of the contacts $c$ completes the energizing circuit for the coil of the bypass valve BV2 so that exhaust from the motor 88 through the conduit 200 can take place only through the relief valve RV2. This valve is adjusted so that it will open only at a pressure greater than that effected in the conduit 200 by the weight of the leg 22 on the pin 76. Consequently, fluid pressure must be supplied to the motor 88 through conduit 198 in order to move the slide 42 down and lower the leg 22.

As the slide approaches the end of its lowering stroke, the limit switch LS3 will be tripped and will thereby close its contacts $e$ and $g$ and open its contacts $f$ and $h$. Closing of the contacts $h$ completes the energizing circuit for the coil of the valve CV1 so that the motor 80 will be operated to project the jack body pin 74 into engagement with the member 28 on the leg 22. The member 28 will continue to slide along the pin 74, however, until the latter becomes aligned with an aperture 32 and is forced thereinto, thereby tripping limit switch LS1 to close its contacts $b$ and $d$ and open its contacts $c$.

Closing of the contacts $b$ completes the energizing circuit for the coil of the valve CV2 so that the motor 80 will operate to withdraw the slide pin 76 as soon as the weight of the leg has been transferred to the jack body pin 74 by the continued downward movement of the slide 42. When the pin 76 is completely retracted, it will trip the limit switch LS2 to open its contacts $i$ and closes its contacts $j$. The closing of the contacts $j$ completes the energizing circuit for the coil of the valve CV3 so that the motor 88 will be operated to move the slide 42 up. At the same time, the opening of the contacts $i$ interrupts the energizing circuit for the coil of the bypass valve BV2 so that this valve will open and the motor 88 can be operated to move the slide 42 up in preparation for another leg-lowering stroke.

The foregoing automatic recycling of the jacking mechanism to lower a leg 22 will continue as long as the wiring strip 232 is plugged into the switchboard 224. In this connection, there normally is no need to link the controls of two or more jacking mechanisms together, by the switch LMS, during such a lowering operation.

Referring now to Figures 16 and 17 of the drawings, there is shown therein an embodiment of the invention wherein more than two jacks 36 constitute a jacking mechanism 338. In this embodiment, there is shown a generally rectangular barge 340 having a supporting leg at each corner in the form of an open-work tower 342, which may be substantially triangular in horizontal section with a corresponding triangular guiding well (not shown). The necessary vertical series of apertures 344 for the reception of the jack body and slide pins 74 and 76, respectively, of the jacks 26 may be formed in an appropriate channel member 346 secured centrally on each side face of the tower 342. Hence, it will be seen that three jacks 36 are included in a jacking mechanism 338 to properly effect relative vertical movement between a tower 342 and the barge 340.

It also will be seen that the jacks 36 could be positioned at each corner of the tower 342 instead of centrally of the side faces thereof. For such "corner" positioning of the jacks 36, it would be necessary to provide appropriate channel members (not shown) at each corner, which channel members would be provided with a vertical series of pin-receiving apertures therein.

In view of the foregoing it will be seen that for proper operation of a pin jack mechanism embodying this invention, it is necessary to employ two or more separate pin-jacks 36 which are spaced substantially uniformly about the periphery of a supporting leg, which latter is preferably of symmetrical configuration in horizontal section. Similarly, it will be realized that although the invention has been described with reference to apertures 32 in a supporting leg for receiving a jack pin, it is to be understood that this term is intended to include equivalent structural arrangements, such as a vertically extending series of pairs of abutments having vertically spaced opposed faces between which such pins may be received.

It thus will be seen that the objects of this invention have been fully and effectively accomplished. It will be realized, however, that the specific embodiments shown and described herein for the purpose of illustrating the principles of this invention, are subject to modification without departure from such principles. Accordingly, this invention includes all embodiments encompassed within the spirit and scope of the following claims:

I claim:

1. In a structure which includes a body and a supporting leg therefor guided for substantially vertical movement relative to the body, the combination comprising: at least one substantially-upright elongated body-supporting leg having at least two longitudinal rows of spaced openings therein; at least two structurally independent jack means, one for each row, for forcefully and selectively effecting upward or downward movements of said leg relative to the body, each of said jack means comprising a pair of members mounted substantially in alignment longitudinally of said leg adjacent the corresponding row of openings therein, interfitting guide means mounting one of said members on the other for movement longitudinally of said leg, an element mounted on each of said members for independent movement transversely of said leg into and out of one of said leg openings in said corresponding row when aligned therewith to prevent relative movement between the corresponding member and said leg longitudinally of the latter when said element is in one of said openings, and means connected to said members for selectively effecting or restraining relative movement therebetween selectively in either direction longitudinally of said leg; interfitting guide means on said leg and on at least one of said members of each of said jack means for constraining relative movement between each of said jack means and said leg to directions extending longitudinally of said leg; and means for securing one of said members of each of said jack means to the body against appreciable relative movement therebetween longitudinally of said leg.

2. The structure defined in claim 1 in which the securing means includes a pair of abutment means adapted to be secured on the body, one facing upwardly and one facing downwardly, alternatively engageable by one of the members of the corresponding jack means to limit, respectively, the extent of downward and upward movement thereof relative to the body.

3. The structure defined in claim 2 including means interposed between the one member and the downwardly-facing abutment member for cushioning the forces exerted therebetween.

4. In a structure which includes a body and a supporting leg therefor guided for substantially vertical and limited canting movement relative to the body, the combination comprising: at least one substantially-upright elongated body-supporting leg having a longitudinal row of spaced openings therein; at least one jack means for forcefully and selectively effecting upward or downward movements of said leg relative to said body comprising a pair of members mounted substantially in alignment longitudinally of said leg adjacent said row of openings therein to one side thereof in nonencircling relation thereto, interfitting guide means mounting one of said members on the other for movement longitudinally of said leg, an element mounted on each of said members for independent movement transversely of said leg into and out of one of said leg openings when aligned therewith to prevent relative movement between the corresponding member and said leg longitudinally of the latter when said element is in one of said openings, and means connected to said members for selectively effecting or restraining relative movement therebetween selectively in either direction longitudinally of said leg; interfitting means on said jack means and on said leg in non-encircling relation to the latter for guiding both for relative movement longitudinally of said leg and against appreciable relative movement therebetween transversely of said leg; and means for connecting a lower portion of said jack means to the body for limited canting movement of said jack means with said leg and for transmitting jacking forces to move said leg in either vertical direction relative to the body.

5. The structure defined in claim 4 in which the connecting means includes means for cushioning the transmission of upward forces imparted to the body through or by the jack means.

6. The structure defined in claim 4 in which the connecting means includes an upwardly facing abutment on the jack means, an opposed downwardly facing abutment adapted to be secured on the body, and resilient means interposed between said abutments.

7. The structure defined in claim 4 in which the connecting means includes an upwardly-facing abutment on the body and an opposed downwardly-facing abutment on the jack means engageable with said upwardly-facing abutment, the opposed engageable surfaces of said abutments being complementary and generally spherical.

8. A jack mechanism for effecting substantially-vertical relative movement between a platform-like body and a body-supporting leg mounted on the body for such movement and having a longitudinal row of spaced openings, comprising: a first elongated member having longitudinal guideway means; a second member mounted in said guideway means for movement longitudinally of said first member; a reciprocating fluid motor connected to said members for forcefully effecting said movement of said second member selectively in either direction; an element mounted on each of said members for movement transversely thereof into and out of one of the leg openings when aligned therewith to prevent relative vertical movement between the corresponding member and said leg when said element is in one of the openings; a fluid motor mounted on each of said members and connected to the said element thereon for effecting movement of said element; and means for connecting said first member to the body for transmitting upward and downward forces thereto.

9. The structure defined in claim 8 in which the connecting means includes means defining an opening through a lower portion of the first member and an inverted generally U-shaped member extending therethrough, the free ends of the legs of said U-shaped member being adapted to be connected to the body.

10. The structure defined in claim 9 in which the opening extends generally normal to the supporting leg.

11. Jack means for effecting substantially-vertical relative movement selectively in either direction between a platform-like body and at least one substantially-upright elongated body-supporting leg mounted on the body for substantially vertical movement relative thereto comprising: a pair of members adapted to be mounted on the body substantially in alignment longitudinally of the leg and each independently releasably engageable with the leg against relative movement therebetween longitudinally of the leg; double-acting fluid motor means connected to said members for effecting relative movement therebetween selectively in either direction longitudinally of the leg; a pair of lines for supplying and exhausting pressure fluid to and from opposite sides of said motor means; back-pressure valve means connected into each of said lines for exhausting fluid from each respective side of said motor means only above a predetermined pressure; and controllable valve means connected into each of said lines in parallel with the corresponding back-pressure valve means for selectively by-passing or rendering effective the latter.

12. The structure defined in claim 11 in which each member is releasably engageable with the leg by an element mounted on the corresponding member for movement transversely of the leg into and out of one of a longitudinal row of openings in the leg, and including a fluid motor for operating each of said elements.

13. Jack means for effecting substantially-vertical relative movement selectively in either direction between a platform-like body and at least one substantially-upright elongated body-supporting leg having a longitudinal row of openings therein and mounted on the body for substantially vertical movement relative thereto, comprising: a pair of members adapted to be mounted on the body substantially in alignment longitudinally of the leg and adjacent the row of openings therein, one of said members being adapted to be connected to the body for transmission of vertical forces between the latter and said jack means; an element mounted on each of said members for movement transversely of the leg into and out of one of the leg openings when aligned therewith to prevent relative vertical movement between the corresponding member and the leg when said element is in one of the openings; fluid motor means for moving each of said elements; double-acting fluid motor means for effecting relative movement between said members in either direction longitudinally of the leg; and means automatically coordinating the operation of all of said motor means to selectively effect a jacking cycle wherein the body is lifted on the leg or conversely the leg is driven downwardly relative to the body, the body is lowered on the leg when at least partially supported thereby, the leg is raised relative to the body when supported thereby, or the leg is lowered relative to the body when supported thereby.

14. The structure defined in claim 13 wherein the coordinating means includes limit switch means for each of the fluid motor means, electro-magnetically-operated valve means for each of said motor means and controlling the operation thereof, and electrical connections between said switch means and valve means.

15. The structure defined in claim 13 wherein the motor means for each element is double-acting.

16. The structure defined in claim 13 including a pair of lines connected to opposite sides of the double-acting motor means for supplying and exhausting pressure fluid to and from opposite sides of said motor means, back-pressure valve means connected into each of said lines for exhausting fluid from each respective side of said motor means only above a predetermined pressure; and controllable valve means connected into each of said lines in parallel with the corresponding back-pressure valve means for selectively by-passing or rendering effective the latter.

17. Jack means for effecting substantially-vertical relative movement selectively in either direction between a platform-like body and at least one substantially-upright elongated body-supporting leg having a longitudinal row of openings therein and mounted on the body for substantially vertical movement relative thereto, comprising: a pair of members adapted to be mounted on the body substantially in alignment longitudinally of the leg and adjacent the row of openings therein, an element mounted on each of said members for movement transversely of the leg into and out of one of the openings in the row therein to prevent relative vertical movement between the corresponding member and the leg when said element is in one of the openings; means for moving said pins selectively; means for effecting relative movement between said members in either direction longitudinally of the leg; and means secured to one of said members for supporting the leg and then quickly releasing the same for free fall when the leg is supported on the body by the jack means and both of said elements are withdrawn from the openings in the leg, said quick-release means comprising a lever mounted on said one member for pivotal movement on a horizontal axis to rock one end of said lever into and out of one of the openings in the leg, said lever end having an upper leg-engaging surface disposed substantially horizontally when said one lever end is positioned in a leg opening, and means for pivoting said lever.

18. The structure defined in claim 17 in which the openings in the leg are uniformly spaced and the vertical distance between the upper surface of the element on the one member and the upper leg-engaging surface of the one lever end, when the latter is in leg-engaging position, is slightly greater than the center-to-center spacing between the leg openings, whereby the lever can be operated to engage and lift the leg slightly relative to said element to remove the weight of the leg from the latter.

19. The structure defined in claim 17 in which the means for pivoting the lever includes a fluid motor.

20. In a structure which includes a body and a supporting leg therefor guided for substantially vertical movement relative to the body, the combination comprising: a body-supporting leg having at least two longitudinal rows of openings therein, said rows being disposed symmetrically about said leg; a jack means for each row of said openings to effect said vertical movement in either direction, each of said jack means comprising an elongated member positioned substantially parallel to said leg and opposed to a corresponding row of said openings therein, a slide, longitudinal guideway means on said member mounting said slide for longitudinal movement on said member opposed to said corresponding row, double-acting fluid motor means connected to said slide and to said member for effecting said longitudinal movement, a pin reciprocatingly mounted on said member for movement transversely of said leg into and out of an opening in said corresponding row, a pin reciprocatingly mounted on said slide for movement transversely of said leg into and out of an opening in said corresponding row, and fluid motor means for each of said pins for reciprocating the same; interfitting dovetail-like means extending longitudinally of said leg and said elongated member and connecting both together for relative longitudinal movement; and means for connecting a lower portion of said elongated member to the body against appreciable vertical relative movement therebetween.

21. The structure defined in claim 20 in which the body is generally rectangular and including a row of the said supporting legs extending along both longitudinal sides of said body with each leg being angularly oriented so that a line extending transversely thereof and through the two rows of openings therein is positioned athwartships of said body.

22. The structure defined in claim 20 in which the connecting means includes an inverted generally U-shaped element extending through a transverse opening in the elongated member and having its free ends secured to the body.

23. The structure defined in claim 20 in which the leg comprises a cylinder having longitudinally extending channel-shaped members secured to diametrically opposite sides thereof, with the free edges of the flanges of each of said members being secured to said cylinder and with the web of each of said members containing one of the said rows of openings, each of said members comprising a part of the dovetail-like means.

24. The structure defined in claim 23 including guiding means for the leg on the body comprising means loosely engaging the outer sides of the flanges and the web of the channel-shaped members.

25. In a structure which includes a body and a supporting leg therefor guided for substantially vertical movement relative to the body, the combination comprising: at least two horizontally-spaced substantially-upright elongated body-supporting legs, each having a longitudinal row of spaced openings therein; a jack means for invention has been described with reference to apertures 32 in a supporting leg for receiving a jack pin, it is to be understood that this term is intended to include equivalent structural arrangements, such as a vertically extending series of pairs of abutments having vertically spaced opposed faces between which such pins may be received.

It thus will be seen that the objects of this invention have been fully and effectively accomplished. It will be realized, however, that the specific embodiments shown and described herein for the purpose of illustrating the principles of this invention, are subject to modification without departure from such principles. Accordingly, this invention includes all embodiments encompassed within the spirit and scope of the following claims:

I claim:

1. In a structure which includes a body and a supporting leg therefor guided for substantially vertical movement relative to the body, the combination comprising: at least one substantially-upright elongated body-supporting leg having at least two longitudinal rows of spaced openings therein; at least two structurally independent jack means, one for each row, for forcefully and selectively effecting upward or downward movements of said leg relative to the body, each of said jack means comprising a pair of members mounted substantially in alignment longitudinally of said leg adjacent the corresponding row of openings therein, interfitting guide means mounting one of said members on the other for movement longitudinally of said leg, an element mounted on each of said members for independent movement transversely of said leg into and out of one of said leg openings in said corresponding row when aligned therewith to prevent relative movement between the corresponding member and said leg longitudinally of the latter when said element is in one of said openings, and means connected to said members for selectively effecting or restraining relative movement therebetween selectively in either direction longitudinally of said leg; interfitting guide means on said leg and on at least one of said members of each of said jack means for constraining relative movement between each of said jack means and said leg to directions extending longitudinally of said leg; and means for securing one of said members of each of said jack means to the body against appreciable relative movement therebetween longitudinally of said leg.

2. The structure defined in claim 1 in which the securing means includes a pair of abutment means adapted to be secured on the body, one facing upwardly and one facing downwardly, alternatively engageable by one of the members of the corresponding jack means to limit, respectively, the extent of downward and upward movement thereof relative to the body.

3. The structure defined in claim 2 including means interposed between the one member and the downwardly-facing abutment member for cushioning the forces exerted therebetween.

4. In a structure which includes a body and a supporting leg therefor guided for substantially vertical and limited canting movement relative to the body, the combination comprising: at least one substantially-upright elongated body-supporting leg having a longitudinal row of spaced openings therein; at least one jack means for forcefully and selectively effecting upward or downward movements of said leg relative to said body comprising a pair of members mounted substantially in alignment longitudinally of said leg adjacent said row of openings therein to one side thereof in nonencircling relation thereto, interfitting guide means mounting one of said members on the other for movement longitudinally of said leg, an element mounted on each of said members for independent movement transversely of said leg into and out of one of said leg openings when aligned therewith to prevent relative movement between the corresponding member and said leg longitudinally of the latter when said element is in one of said openings, and means connected to said members for selectively effecting or restraining relative movement therebetween selectively in either direction longitudinally of said leg; interfitting means on said jack means and on said leg in non-encircling relation to the latter for guiding both for relative movement longitudinally of said leg and against appreciable relative movement therebetween transversely of said leg; and means for connecting a lower portion of said jack means to the body for limited canting movement of said jack means with said leg and for transmitting jacking forces to move said leg in either vertical direction relative to the body.

5. The structure defined in claim 4 in which the connecting means includes means for cushioning the transmission of upward forces imparted to the body through or by the jack means.

6. The structure defined in claim 4 in which the connecting means includes an upwardly facing abutment on the jack means, an opposed downwardly facing abutment adapted to be secured on the body, and resilient means interposed between said abutments.

7. The structure defined in claim 4 in which the connecting means includes an upwardly-facing abutment on the body and an opposed downwardly-facing abutment on the jack means engageable with said upwardly-facing abutment, the opposed engageable surfaces of said abutments being complementary and generally spherical.

8. A jack mechanism for effecting substantially-vertical relative movement between a platform-like body and a body-supporting leg mounted on the body for such movement and having a longitudinal row of spaced openings, comprising: a first elongated member having longitudinal guideway means; a second member mounted in said guideway means for movement longitudinally of said first member; a reciprocating fluid motor connected to said members for forcefully effecting said movement of said second member selectively in either direction; an element mounted on each of said members for movement transversely thereof into and out of one of the leg openings when aligned therewith to prevent relative vertical movement between the corresponding member and said leg when said element is in one of the openings; a fluid motor mounted on each of said members and connected to the said element thereon for effecting movement of said element; and means for connecting said first member to the body for transmitting upward and downward forces thereto.

9. The structure defined in claim 8 in which the connecting means includes means defining an opening through a lower portion of the first member and an inverted generally U-shaped member extending therethrough, the free ends of the legs of said U-shaped member being adapted to be connected to the body.

10. The structure defined in claim 9 in which the opening extends generally normal to the supporting leg.

11. Jack means for effecting substantially-vertical relative movement selectively in either direction between a platform-like body and at least one substantially-upright elongated body-supporting leg mounted on the body for substantially vertical movement relative thereto comprising: a pair of members adapted to be mounted on the body substantially in alignment longitudinally of the leg and each independently releasably engageable with the leg against relative movement therebetween longitudinally of the leg; double-acting fluid motor means connected to said members for effecting relative movement therebetween selectively in either direction longitudinally of the leg; a pair of lines for supplying and exhausting pressure fluid to and from opposite sides of said motor means; back-pressure valve means connected into each of said lines for exhausting fluid from each respective side of said motor means only above a predetermined pressure; and controllable valve means connected into each of said lines in parallel with the corresponding back-pressure valve means for selectively by-passing or rendering effective the latter.

12. The structure defined in claim 11 in which each member is releasably engageable with the leg by an element mounted on the corresponding member for movement transversely of the leg into and out of one of a longitudinal row of openings in the leg, and including a fluid motor for operating each of said elements.

13. Jack means for effecting substantially-vertical relative movement selectively in either direction between a platform-like body and at least one substantially-upright elongated body-supporting leg having a longitudinal row of openings therein and mounted on the body for substantially vertical movement relative thereto, comprising: a pair of members adapted to be mounted on the body substantially in alignment longitudinally of the leg and adjacent the row of openings therein, one of said members being adapted to be connected to the body for transmission of vertical forces between the latter and said jack means; an element mounted on each of said members for movement transversely of the leg into and out of one of the leg openings when aligned therewith to prevent relative vertical movement between the corresponding member and the leg when said element is in one of the openings; fluid motor means for moving each of said elements; double-acting fluid motor means for effecting relative movement between said members in either direction longitudinally of the leg; and means automatically coordinating the operation of all of said motor means to selectively effect a jacking cycle wherein the body is lifted on the leg or conversely the leg is driven downwardly relative to the body, the body is lowered on the leg when at least partially supported thereby, the leg is raised relative to the body when supported thereby, or the leg is lowered relative to the body when supported thereby.

14. The structure defined in claim 13 wherein the coordinating means includes limit switch means for each of the fluid motor means, electro-magnetically-operated valve means for each of said motor means and controlling the operation thereof, and electrical connections between said switch means and valve means.

15. The structure defined in claim 13 wherein the motor means for each element is double-acting.

16. The structure defined in claim 13 including a pair of lines connected to opposite sides of the double-acting motor means for supplying and exhausting pressure fluid to and from opposite sides of said motor means, back-pressure valve means connected into each of said lines for exhausting fluid from each respective side of said motor means only above a predetermined pressure; and controllable valve means connected into each of said lines in parallel with the corresponding back-pressure valve means for selectively by-passing or rendering effective the latter.

17. Jack means for effecting substantially-vertical relative movement selectively in either direction between a platform-like body and at least one substantially-upright elongated body-supporting leg having a longitudinal row of openings therein and mounted on the body for substantially vertical movement relative thereto, comprising: a pair of members adapted to be mounted on the body substantially in alignment longitudinally of the leg and adjacent the row of openings therein, an element mounted on each of said members for movement transversely of the leg into and out of one of the openings in the row therein to prevent relative vertical movement between the corresponding member and the leg when said element is in one of the openings; means for moving said pins selectively; means for effecting relative movement between said members in either direction longitudinally of the leg; and means secured to one of said members for supporting the leg and then quickly releasing the same for free fall when the leg is supported on the body by the jack means and both of said elements are withdrawn from the openings in the leg, said quick-release means comprising a lever mounted on said one member for pivotal movement on a horizontal axis to rock one end of said lever into and out of one of the openings in the leg, said lever end having an upper leg-engaging surface disposed substantially horizontally when said one lever end is positioned in a leg opening, and means for pivoting said lever.

18. The structure defined in claim 17 in which the openings in the leg are uniformly spaced and the vertical distance between the upper surface of the element on the one member and the upper leg-engaging surface of the one lever end, when the latter is in leg-engaging position, is slightly greater than the center-to-center spacing between the leg openings, whereby the lever can be operated to engage and lift the leg slightly relative to said element to remove the weight of the leg from the latter.

19. The structure defined in claim 17 in which the means for pivoting the lever includes a fluid motor.

20. In a structure which includes a body and a supporting leg therefor guided for substantially vertical movement relative to the body, the combination comprising: a body-supporting leg having at least two longitudinal rows of openings therein, said rows being disposed symmetrically about said leg; a jack means for each row of said openings to effect said vertical movement in either direction, each of said jack means comprising an elongated member positioned substantially parallel to said leg and opposed to a corresponding row of said openings therein, a slide, longitudinal guideway means on said member mounting said slide for longitudinal movement on said member opposed to said corresponding row, double-acting fluid motor means connected to said slide and to said member for effecting said longitudinal movement, a pin reciprocatingly mounted on said member for movement transversely of said leg into and out of an opening in said corresponding row, a pin reciprocatingly mounted on said slide for movement transversely of said leg into and out of an opening in said corresponding row, and fluid motor means for each of said pins for reciprocating the same; interfitting dovetail-like means extending longitudinally of said leg and said elongated member and connecting both together for relative longitudinal movement; and means for connecting a lower portion of said elongated member to the body against appreciable vertical relative movement therebetween.

21. The structure defined in claim 20 in which the body is generally rectangular and including a row of the said supporting legs extending along both longitudinal sides of said body with each leg being angularly oriented so that a line extending transversely thereof and through the two rows of openings therein is positioned athwartships of said body.

22. The structure defined in claim 20 in which the connecting means includes an inverted generally U-shaped element extending through a transverse opening in the elongated member and having its free ends secured to the body.

23. The structure defined in claim 20 in which the leg comprises a cylinder having longitudinally extending channel-shaped members secured to diametrically opposite sides thereof, with the free edges of the flanges of each of said members being secured to said cylinder and with the web of each of said members containing one of the said rows of openings, each of said members comprising a part of the dovetail-like means.

24. The structure defined in claim 23 including guiding means for the leg on the body comprising means loosely engaging the outer sides of the flanges and the web of the channel-shaped members.

25. In a structure which includes a body and a supporting leg therefor guided for substantially vertical movement relative to the body, the combination comprising: at least two horizontally-spaced substantially-upright elongated body-supporting legs, each having a longitudinal row of spaced openings therein; a jack means for each of said legs for forcefully and selectively effecting upward or downward step-by-step movements of the corresponding leg relative to the body, each of said jack means including a pair of members mounted substantially in alignment longitudinally of the corresponding leg adjacent said row of openings therein, each of said members being independently movable longitudinally of the corresponding leg, an element mounted on each of said members for movement transversely of the corresponding leg into and out of one of said leg openings when aligned therewith to prevent relative movement between the corresponding member and the corresponding leg longitudinally of the latter when said element is in one of said openings, power-operated means for effecting relative movement between said members selectively in either direction longitudinally of the corresponding leg, and power operated means for each of said elements for moving the latter into and out of one of the corresponding leg openings when aligned therewith; means for securing each of said jack means to the body against appreciable relative movement therebetween longitudinally of the corresponding leg; and means for operating both of said jack means in unison to lift or lower the body on said legs even though the openings in the row in one of said legs are not in horizontal alignment with the openings in the row in the other of said legs, said operating means including means responsive to the termination of a jacking stroke of each of said jack means for discontinuing the jacking stroke of the other of said jack means until each of said jack means begins another jacking stroke.

26. The structure defined in claim 25 in which the operating means includes a limit switch for each jack means operable with a corresponding element thereof, an electrically operable means for each of said jack means controlling the operation of the corresponding power-operated means for effecting relative movement between the corresponding members, and electric connections between the limit switches of each of said jack means and the electrically operable control means of the other of said jack means.

27. Jack means for selectively effecting or restraining substantially-vertical relative movement selectively in either direction between a platform-like body and at least one substantially-upright body-supporting leg mounted on the body for substantially vertical movement relative thereto comprising: a pair of members mounted on the body substantially in alignment longitudinally of the leg and each independently releasably engageable with the leg against relative movement therebetween longitudinally of the leg, one of said members being substantially fixed to the body against appreciable movement relative thereto longitudinally of the leg and the other of said members being movable relative to the body longitudinally of the leg; double-acting fluid motor means connected to said members for selectively effecting or restraining relative movement therebetween selectively in either direction longitudinally of the leg; means for supplying fluid under pressure selectively to one or the other ends of the motor means while exhausting fluid from the opposite end in order to forcefully operate the motor means selectively in either direction; and back-pressure valve means connected for exhaust of fluid therethrough to that end of the motor means from which fluid is exhausted when the body is being lowered on the leg, said valve means permitting exhaust of fluid therethrough only above a predetermined pressure greater than that developable in the motor means by the proportionate share of the weight of the body on the leg, whereby the body can be lowered on the leg only by supplying fluid under pressure to the motor means.

28. The structure defined in claim 27 including controllable valve means connected in parallel with the back-pressure valve means for selectively by-passing or rendering effective the latter.

29. In a structure which includes a buoyant body and a supporting leg therefor guided for substantially vertical movement relative to the body, the combination comprising: at least one substantially-upright body-supporting leg having a longitudinal row of spaced openings therein; and at least one jack means for forcefully and selectively effecting upward or downward movements of said leg relative to the body comprising a pair of load-sustaining rigid structures mounted substantially in ailgnment longitudinally of said leg adjacent said row of openings therein and to one side thereof in nonencircling relation thereto, one of said structures being adapted to be secured to the body for transmitting generally vertical loads thereto and therefrom, interfitting guide means mounting one of said structures on the other to constrain relative movement therebetween to directions extending longitudinally of said leg, interfitting guide means on at least one of said structures and said leg in nonencircling relation to the latter for constraining relative movement therebetween to directions extending longitudinally of said leg, an element mounted on each of said structures for independent movement transversely of said leg into and out of one of said leg openings when aligned therewith to prevent relative movement between the corresponding structure and said leg longitudinally of the latter when said element is in one of said openings, and motor means connected to said structures for selectively effecting or restraining relative movement therebetween selectively in either direction longitudinally of said leg.

30. The structure defined in claim 29 in which the interfitting guide means on one of said structures and on said leg comprises substantially a dovetail arrangement.

31. A jacking mechanism for effecting vertical movement in either direction between a marine platform and one of its supporting legs, comprising: a supporting leg having a longitudinal row of spaced openings therein; a jack body adapted to be connected to the platform and disposed entirely to one side of said leg in nonencircling relation thereto for transmitting upward or downward jacking forces to said supporting leg; interfitting guide means on said body and on said leg in nonencircling relation to the latter for constraining relative movement between said body and said leg to directions extending longitudinally of the latter; a member mounted on said body for movement relative thereto longitudinally of said leg, a first pin element on said body and a second pin element on said member each mounted opposite said longitudinal row of spaced openings on said leg for independent movement transversely of said leg into or out of one of said openings when aligned therewith to lock said body or member to said leg against said relative movement when the corresponding pin element is in one of said openings; and motor means for selectively forcefully effecting or restraining movement of said member relative to said body in order to effect relative movement between said leg and said body or to effect relative movement between said member and said leg according to the transverse positions of said pin elements.

References Cited in the file of this patent

UNITED STATES PATENTS

| | | |
|---|---|---|
| 103,899 | Lewis | June 7, 1870 |
| 917,349 | Opsal | Apr. 6, 1909 |
| 985,371 | Roeth | Feb. 28, 1911 |
| 1,063,156 | Cohen | May 27, 1913 |
| 1,117,516 | Petrie | Nov. 17, 1914 |
| 2,479,623 | Johnson | Aug. 23, 1949 |
| 2,540,679 | Laffaille | Feb. 6, 1951 |
| 2,592,448 | McMenimen | Apr. 8, 1952 |
| 2,673,064 | Patterson et al. | Mar. 23, 1954 |
| 2,775,869 | Pointer | Jan. 1, 1957 |

FOREIGN PATENTS

| | | |
|---|---|---|
| 612,201 | Great Britain | Nov. 9, 1948 |
| 913,784 | Germany | June 21, 1954 |